United States Patent
Islam et al.

(10) Patent No.: US 11,764,914 B2
(45) Date of Patent: Sep. 19, 2023

(54) NUMEROLOGY DEPENDENT SIGNAL TRANSMISSION

(71) Applicant: QUALCOMM Incorporated, San Diego, CA (US)

(72) Inventors: Muhammad Nazmul Islam, Edison, NJ (US); Tao Luo, San Diego, CA (US); Sundar Subramanian, Bridgewater, NJ (US); Junyi Li, Chester, NJ (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/369,602

(22) Filed: Dec. 5, 2016

(65) Prior Publication Data
US 2017/0325256 A1    Nov. 9, 2017

Related U.S. Application Data

(60) Provisional application No. 62/333,397, filed on May 9, 2016.

(51) Int. Cl.
*H04L 5/00*    (2006.01)
*H04W 72/044*   (2023.01)
(Continued)

(52) U.S. Cl.
CPC .............. *H04L 5/0007* (2013.01); *H04L 1/08* (2013.01); *H04W 72/044* (2013.01);
(Continued)

(58) Field of Classification Search
CPC ........... H04W 72/1263; H04W 72/042; H04W 72/044; H04L 1/08; H04L 5/0007;
(Continued)

(56) References Cited

U.S. PATENT DOCUMENTS

| 7,991,079 B2 | 8/2011 | Mujtaba |
| 8,542,658 B2 | 9/2013 | Laroia et al. |

(Continued)

FOREIGN PATENT DOCUMENTS

| CN | 104854801 A | 8/2015 |
| CN | 104854929 A | 8/2015 |

(Continued)

OTHER PUBLICATIONS

ISA/EP, International Search Report and Written Opinion of the International Searching Authority, Int'l Application No. PCT/US2017/026836, dated Jul. 17, 2017, European Patent Office, Rijswijk, NL, 18 pgs.

(Continued)

*Primary Examiner* — Ian N Moore
*Assistant Examiner* — Latresa A McCallum
(74) *Attorney, Agent, or Firm* — Holland & Hart LLP

(57) ABSTRACT

Methods, systems, and devices for wireless communication are described. The methods, systems, and devices provide for identifying tone spacing for transmission or reception of signals. The identified tone spacing may vary depending on the transmission or reception spectrum band or signal type. Using the identified tone spacing, a number of repetitions or a number of symbols for transmission or receiver algorithm of a signal may be determined.

13 Claims, 24 Drawing Sheets

(51) Int. Cl.
  *H04W 72/23*     (2023.01)
  *H04L 1/08*      (2006.01)
  *H04W 72/1263*   (2023.01)
  *H04L 27/26*     (2006.01)

(52) U.S. Cl.
  CPC ....... *H04W 72/1263* (2013.01); *H04W 72/23* (2023.01); *H04L 5/001* (2013.01); *H04L 5/0048* (2013.01); *H04L 27/2602* (2013.01); *H04L 27/26025* (2021.01)

(58) Field of Classification Search
  CPC ... H04L 5/001; H04L 5/0048; H04L 27/2602; H04L 1/0013; H04L 1/0067; H04L 1/858; H04L 1/189
  See application file for complete search history.

(56) References Cited

U.S. PATENT DOCUMENTS

| | | | |
|---|---|---|---|
| 8,565,211 B2* | 10/2013 | Ko | H04L 27/2614 370/344 |
| 8,902,864 B2 | 12/2014 | Loroia et al. | |
| 9,131,351 B2 | 9/2015 | Malladi et al. | |
| 9,312,929 B2* | 4/2016 | Forenza | H04B 7/024 |
| 9,622,202 B2 | 4/2017 | Kim et al. | |
| 2005/0085214 A1 | 4/2005 | Laroia et al. | |
| 2006/0023666 A1 | 2/2006 | Jalali et al. | |
| 2006/0083159 A1* | 4/2006 | Laroia | H04L 27/2601 370/208 |
| 2006/0083211 A1* | 4/2006 | Laroia | H04L 5/0042 370/343 |
| 2008/0205351 A1 | 8/2008 | Lindoff et al. | |
| 2011/0032850 A1 | 2/2011 | Cai | |
| 2012/0099519 A1* | 4/2012 | Kim | H04L 5/00 370/315 |
| 2013/0088984 A1* | 4/2013 | Lee | H04L 5/0057 370/252 |
| 2013/0178220 A1* | 7/2013 | Lee | H04L 5/0035 455/450 |
| 2013/0329659 A1 | 12/2013 | Kim et al. | |
| 2014/0133413 A1 | 5/2014 | Kim et al. | |
| 2014/0233457 A1* | 8/2014 | Koutsimanis | H04L 5/0073 370/328 |
| 2014/0293881 A1* | 10/2014 | Khoshnevis | H04L 5/0046 370/329 |
| 2014/0301346 A1* | 10/2014 | Seo | H04L 5/0048 370/329 |
| 2015/0180622 A1 | 6/2015 | Yoo et al. | |
| 2015/0180636 A1 | 6/2015 | Malladi et al. | |
| 2015/0256308 A1* | 9/2015 | Ma | H04L 5/0035 370/330 |
| 2015/0263839 A1 | 9/2015 | He et al. | |
| 2015/0280871 A1 | 10/2015 | Xu et al. | |
| 2015/0295676 A1 | 10/2015 | Kenney et al. | |
| 2016/0165622 A1 | 6/2016 | Luo et al. | |
| 2016/0301555 A1* | 10/2016 | Nory | H04L 5/001 |
| 2017/0099126 A1* | 4/2017 | Yoo | H04L 5/0048 |
| 2017/0164350 A1* | 6/2017 | Sun | H04W 72/0413 |
| 2017/0195888 A1* | 7/2017 | Gou | H04L 27/2601 |
| 2017/0201968 A1* | 7/2017 | Nam | H04W 72/0446 |
| 2017/0290008 A1* | 10/2017 | Tooher | H04W 72/0446 |
| 2017/0311315 A1 | 10/2017 | Islam et al. | |

FOREIGN PATENT DOCUMENTS

| | | |
|---|---|---|
| EP | 2916600 A1 | 9/2015 |
| EP | 3446430 A1 | 2/2019 |
| JP | 2014027684 A | 2/2014 |
| WO | WO-2015099804 A1 | 7/2015 |
| WO | WO-2015148076 A1 | 10/2015 |

OTHER PUBLICATIONS

Nakamura, "Confidential 5G Concept and Technologies", NTT Docomo Incorporation, Copyright, Jan. 1, 2014, XP055388579, Retrieved from the Internet: URL:http://5gworkshop.hhi.fraunhofer.de/wp-content/uploads/2014/12/Globecom-2014-WS-on-5G-New-Air-Interface-NTT-DOCOMO.pdf, 31 pages.

ETRI 8.1.6, "Band agnostic synchronization and cell search," R1-166949, 3GPP TSG RAN WG1 Meeting #86, Gothenburg, Sweden, Aug. 22-26, 2016, pp. 1-3.

Mediatek Inc: "Discussion on resource allocation of NB-PUSCH", 3GPP Draft, 3GPP TSG-RAN WG1 NB-IOT Ad-Hoc Meeting, R1-160164, Jan. 17, 2016 (Jan. 17, 2016), XP051053483, 5 pages.

* cited by examiner

NUMEROLOGY DEPENDENT SIGNAL TRANSMISSION

CROSS REFERENCES

The present application for patent claims priority to U.S. Provisional Patent Application No. 62/333,397 by Islam, et al., entitled "Numerology Dependent Signal Transmission," filed May 9, 2016, assigned to the assignee hereof.

BACKGROUND

The following relates generally to wireless communication, and more specifically to numerology dependent signal transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

A wireless communications system may use different spectrum bands for supporting communication between a base station and a UE. The spectrum bands may be, for example, in a range between 700 and 3500 megahertz (MHz) (e.g., in an LTE system) to between 30 and 300 gigahertz (GHz) (e.g., in a millimeter wave (mmW) system), among others. When communicating with a UE, a base station may modulate data based on a modulation and coding scheme (MCS). The modulated data may then be mapped to sub-carriers in the frequency domain known as tones and resources in the time domain known as symbols. Each tone may be associated with a frequency and each symbol may have a corresponding symbol duration. While UEs and base stations in a multiple-access communications system may support different spectrum bands, using the same or similar tone spacing, number of symbols, and symbol durations for communication in different spectrum bands may result in inter-symbol interference, a lack of signal reception (e.g., due to the Doppler effect), or may have other deleterious effects on receptions and transmissions.

SUMMARY

The described techniques relate to improved methods, systems, devices, or apparatuses that support numerology dependent signal transmission. Generally, the described techniques provide for varying tone spacing for transmission or reception of a signal. The tone spacing may vary depending on the spectrum band used to transmit the signal. The tone spacing may also depend on the signal type such that the same type of signal may be transmitted with one tone spacing in a first spectrum band, but transmitted with a different tone spacing in a second spectrum band.

Based on the tone spacing, a number of repetitions, a number of symbols, or a symbol duration for transmitting or receiving a signal may be determined. The number of repetitions may indicate the number of times a signal is transmitted using resources allocated for transmission of the signal. The number of symbols may indicate the number of symbols used for transmission of the signal and the symbol duration may indicate the length (in time) of each of the number of symbols. In some examples, the determined number of repetitions, the determined number of symbols, or the determined symbol duration may vary depending on the spectrum band used for communication or the signal type being transmitted or received.

A method of wireless communication is described. The method may include identifying a tone spacing from a plurality of available tone spacings, determining a first number of repetitions of a first signal based at least in part on the identified tone spacing, identifying signaling information indicating the determined first number of repetitions, transmitting the signaling information via a control channel, and transmitting the first signal based at least in part on the determined first number of repetitions.

An apparatus for wireless communication is described. The apparatus may include means for identifying a tone spacing from a plurality of available tone spacings, means for determining a first number of repetitions of a first signal based at least in part on the identified tone spacing, means for identifying signaling information indicating the determined first number of repetitions, means for transmitting the signaling information via a control channel, and means for transmitting the first signal based at least in part on the determined first number of repetitions.

Another apparatus for wireless communication is described. The apparatus may include a processor, memory in electronic communication with the processor, and instructions stored in the memory. The instructions may be operable to cause the processor to identify a tone spacing from a plurality of available tone spacings, determine a first number of repetitions of a first signal based at least in part on the identified tone spacing, identify signaling information indicating the determined first number of repetitions, transmit the signaling information via a control channel, and transmit the first signal based at least in part on the determined first number of repetitions.

A non-transitory computer readable medium for wireless communication is described. The non-transitory computer-readable medium may include instructions operable to cause a processor to identify a tone spacing from a plurality of available tone spacings, determine a first number of repetitions of a first signal based at least in part on the identified tone spacing, identify signaling information indicating the determined first number of repetitions, transmit the signaling information via a control channel, and transmit the first signal based at least in part on the determined first number of repetitions.

In some examples of the method, apparatus, and non-transitory computer-readable medium described above, determining the first number of repetitions comprises: selecting the first number of repetitions from a set of predetermined repetitions corresponding to the identified tone spacing.

In some examples of the method, apparatus, and non-transitory computer-readable medium described above, determining the first number of repetitions comprises: selecting the first number of repetitions from a set of predetermined repetitions corresponding to a communication scenario.

In some examples of the method, apparatus, and non-transitory computer-readable medium described above, the communication scenario comprises at least one of a handover procedure, a connection procedure, a scheduling procedure, or any combination thereof.

Some examples of the method, apparatus, and non-transitory computer-readable medium described above may further include processes, features, means, or instructions for identifying a spectrum band for transmission of the first signal, wherein identifying the tone spacing may be based at least in part on the identified spectrum band.

Some examples of the method, apparatus, and non-transitory computer-readable medium described above may further include processes, features, means, or instructions for identifying a second tone spacing from the plurality of available tone spacings. Some examples of the method, apparatus, and non-transitory computer-readable medium described above may further include processes, features, means, or instructions for determining a second number of repetitions of a second signal based at least in part on the identified second tone spacing, wherein the determined second number of repetitions may be different from the determined first number of repetitions.

Some examples of the method, apparatus, and non-transitory computer-readable medium described above may further include processes, features, means, or instructions for identifying a second spectrum band for transmission of the second signal, wherein identifying the second tone spacing may be based at least in part on the identified second spectrum band.

In some examples of the method, apparatus, and non-transitory computer-readable medium described above, identifying the tone spacing comprises: determining a signal type associated with the first signal. Some examples of the method, apparatus, and non-transitory computer-readable medium described above may further include processes, features, means, or instructions for identifying the tone spacing based at least in part on the determined signal type.

In some examples of the method, apparatus, and non-transitory computer-readable medium described above, the signal type associated with the first signal comprises one of a beam refinement reference signal, a primary synchronization signal, a secondary synchronization signal, an extended synchronization signal, a random access channel, a scheduling request channel, a physical broadcast channel, a beam reference signal, an extended physical broadcast channel, a physical downlink control channel, or a physical uplink control channel.

In some examples of the method, apparatus, and non-transitory computer-readable medium described above, the control channel comprises a radio resource control channel, a physical downlink control channel, a synchronization channel, a physical uplink control channel, a physical uplink shared channel, or a broadcast channel.

In some examples of the method, apparatus, and non-transitory computer-readable medium described above, transmitting the signaling information via the physical downlink control channel comprises: reserving bits in downlink control information to convey the determined first number of repetitions.

Some examples of the method, apparatus, and non-transitory computer-readable medium described above may further include processes, features, means, or instructions for determining the first number of repetitions may be based at least in part on a carrier frequency of a spectrum band.

A method of wireless communication is described. The method may include identifying a tone spacing from a plurality of available tone spacings, determining a number of symbols to be used in a time duration for transmission of a signal based at least in part on the identified tone spacing, identifying signaling information indicating the determined number of symbols, transmitting the signaling information via a control channel, and transmitting the signal based at least in part on the determined number of symbols.

An apparatus for wireless communication is described. The apparatus may include means for identifying a tone spacing from a plurality of available tone spacings, means for determining a number of symbols to be used in a time duration for transmission of a signal based at least in part on the identified tone spacing, means for identifying signaling information indicating the determined number of symbols, means for transmitting the signaling information via a control channel, and means for transmitting the signal based at least in part on the determined number of symbols.

Another apparatus for wireless communication is described. The apparatus may include a processor, memory in electronic communication with the processor, and instructions stored in the memory. The instructions may be operable to cause the processor to identify a tone spacing from a plurality of available tone spacings, determine a number of symbols to be used in a time duration for transmission of a signal based at least in part on the identified tone spacing, identify signaling information indicating the determined number of symbols, transmit the signaling information via a control channel, and transmit the signal based at least in part on the determined number of symbols.

A non-transitory computer readable medium for wireless communication is described. The non-transitory computer-readable medium may include instructions operable to cause a processor to identify a tone spacing from a plurality of available tone spacings, determine a number of symbols to be used in a time duration for transmission of a signal based at least in part on the identified tone spacing, identify signaling information indicating the determined number of symbols, transmit the signaling information via a control channel, and transmit the signal based at least in part on the determined number of symbols.

In some examples of the method, apparatus, and non-transitory computer-readable medium described above, the time duration denotes a subframe, a slot, a mini-slot, or any combination thereof.

In some examples of the method, apparatus, and non-transitory computer-readable medium described above, determining the number of symbols comprises: selecting the number of symbols from a set of predetermined symbols corresponding to the identified tone spacing.

In some examples of the method, apparatus, and non-transitory computer-readable medium described above, determining the number of symbols comprises: selecting the number of symbols from a set of predetermined symbols corresponding to a communication scenario.

In some examples of the method, apparatus, and non-transitory computer-readable medium described above, the communication scenario comprises at least one of a handover procedure, a connection procedure, a scheduling procedure, or any combination thereof.

Some examples of the method, apparatus, and non-transitory computer-readable medium described above may further include processes, features, means, or instructions for identifying a spectrum band for transmission of the signal, wherein identifying the tone spacing may be based at least in part on the identified spectrum band.

Some examples of the method, apparatus, and non-transitory computer-readable medium described above may further include processes, features, means, or instructions for identifying a second tone spacing from the plurality of available tone spacings. Some examples of the method, apparatus, and non-transitory computer-readable medium described above may further include processes, features, means, or instructions for determining a second number of symbols of a second signal based at least in part on the identified second tone spacing. Some examples of the method, apparatus, and non-transitory computer-readable medium described above may further include processes, features, means, or instructions for identifying a second spectrum band for transmission of the second signal, wherein identifying the second tone spacing may be based at least in part on the identified second spectrum band.

Some examples of the method, apparatus, and non-transitory computer-readable medium described above may further include processes, features, means, or instructions for determining a symbol duration for each of the number of symbols, wherein transmitting the signal may be based at least in part on the symbol duration.

In some examples of the method, apparatus, and non-transitory computer-readable medium described above, identifying the tone spacing comprises: determining a signal type associated with the signal, wherein identifying the tone spacing may be based at least in part on the signal type.

In some examples of the method, apparatus, and non-transitory computer-readable medium described above, the signal type associated with the signal comprises one of a beam refinement reference signal, a primary synchronization signal, a secondary synchronization signal, a physical broadcast channel, a random access channel, a scheduling request channel, an extended synchronization signal, a beam reference signal, an extended physical broadcast channel, a physical downlink control channel, or a physical uplink control channel.

In some examples of the method, apparatus, and non-transitory computer-readable medium described above, the control channel comprises a radio resource control channel, a physical downlink control channel, a synchronization channel, a physical uplink control channel, a physical uplink shared channel, or a broadcast channel.

In some examples of the method, apparatus, and non-transitory computer-readable medium described above, transmitting the signaling information via the physical downlink control channel comprises: reserving bits in downlink control information to convey the determined number of symbols.

Some examples of the method, apparatus, and non-transitory computer-readable medium described above may further include processes, features, means, or instructions for determining the number of symbols may be based at least in part on a carrier frequency associated with a spectrum band.

A method of wireless communication is described. The method may include identifying a tone spacing from a plurality of available tone spacings, receiving signaling information via a control channel, determining a first number of repetitions of a first signal based at least in part on the identified tone spacing, or the received signaling information, or a combination thereof, and receiving the first signal based at least in part on the determined first number of repetitions.

An apparatus for wireless communication is described. The apparatus may include means for identifying a tone spacing from a plurality of available tone spacings, means for receiving signaling information via a control channel, means for determining a first number of repetitions of a first signal based at least in part on the identified tone spacing, or the received signaling information, or a combination thereof, and means for receiving the first signal based at least in part on the determined first number of repetitions.

Another apparatus for wireless communication is described. The apparatus may include a processor, memory in electronic communication with the processor, and instructions stored in the memory. The instructions may be operable to cause the processor to identify a tone spacing from a plurality of available tone spacings, receive signaling information via a control channel, determine a first number of repetitions of a first signal based at least in part on the identified tone spacing, or the received signaling information, or a combination thereof, and receive the first signal based at least in part on the determined first number of repetitions.

A non-transitory computer readable medium for wireless communication is described. The non-transitory computer-readable medium may include instructions operable to cause a processor to identify a tone spacing from a plurality of available tone spacings, receive signaling information via a control channel, determine a first number of repetitions of a first signal based at least in part on the identified tone spacing, or the received signaling information, or a combination thereof, and receive the first signal based at least in part on the determined first number of repetitions.

Some examples of the method, apparatus, and non-transitory computer-readable medium described above may further include processes, features, means, or instructions for identifying a spectrum band for reception of the first signal, wherein identifying the tone spacing may be based at least in part on the identified spectrum band.

In some examples of the method, apparatus, and non-transitory computer-readable medium described above, receiving the first signal comprises: combining multiple repetitions of the first signal based at least in part on the determined first number of repetitions.

Some examples of the method, apparatus, and non-transitory computer-readable medium described above may further include processes, features, means, or instructions for identifying a second tone spacing from the plurality of available tone spacings. Some examples of the method, apparatus, and non-transitory computer-readable medium described above may further include processes, features, means, or instructions for determining a second number of repetitions of a second signal based at least in part on the identified second tone spacing, or the received signaling information, or a combination thereof, wherein the determined second number of repetitions may be different from the determined first number of repetitions.

In some examples of the method, apparatus, and non-transitory computer-readable medium described above, the first signal comprises one of a beam refinement reference signal, a primary synchronization signal, a secondary synchronization signal, a physical broadcast channel, a random access channel, a scheduling request channel, an extended synchronization signal, a beam reference signal, an extended physical broadcast channel, a physical downlink control channel, or a physical uplink control channel.

In some examples of the method, apparatus, and non-transitory computer-readable medium described above, the control channel comprises a radio resource control channel, a physical downlink control channel, a synchronization channel, a physical uplink control channel, a physical uplink shared channel, or a broadcast channel.

In some examples of the method, apparatus, and non-transitory computer-readable medium described above, receiving the signaling information via the physical downlink control channel comprises: obtaining reserved bits in downlink control information that convey the first number of repetitions.

Some examples of the method, apparatus, and non-transitory computer-readable medium described above may further include processes, features, means, or instructions for determining the first number of repetitions of the first signal may be based at least in part on a carrier frequency associated with a spectrum band.

Some examples of the method, apparatus, and non-transitory computer-readable medium described above may further include processes, features, means, or instructions for determining a receiver algorithm associated with the first signal based at least in part on the determined tone spacing.

A method of wireless communication is described. The method may include identifying a tone spacing from a plurality of available tone spacings, receiving signaling information via a control channel, determining a number of symbols to be used in a time duration for reception of a signal based at least in part on the identified tone spacing, or the received signaling information, or a combination thereof, and receiving the signal based at least in part on the determined number of symbols.

An apparatus for wireless communication is described. The apparatus may include means for identifying a tone spacing from a plurality of available tone spacings, means for receiving signaling information via a control channel, means for determining a number of symbols to be used in a time duration for reception of a signal based at least in part on the identified tone spacing, or the received signaling information, or a combination thereof, and means for receiving the signal based at least in part on the determined number of symbols.

Another apparatus for wireless communication is described. The apparatus may include a processor, memory in electronic communication with the processor, and instructions stored in the memory. The instructions may be operable to cause the processor to identify a tone spacing from a plurality of available tone spacings, receive signaling information via a control channel, determine a number of symbols to be used in a time duration for reception of a signal based at least in part on the identified tone spacing, or the received signaling information, or a combination thereof, and receive the signal based at least in part on the determined number of symbols.

A non-transitory computer readable medium for wireless communication is described. The non-transitory computer-readable medium may include instructions operable to cause a processor to identify a tone spacing from a plurality of available tone spacings, receive signaling information via a control channel, determine a number of symbols to be used in a time duration for reception of a signal based at least in part on the identified tone spacing, or the received signaling information, or a combination thereof, and receive the signal based at least in part on the determined number of symbols.

In some examples of the method, apparatus, and non-transitory computer-readable medium described above, the time duration denotes a subframe, a slot, a mini-slot, or any combination thereof.

In some examples of the method, apparatus, and non-transitory computer-readable medium described above, receiving the signal comprises: combining multiple symbols of the time duration based at least in part on the determined number of symbols.

Some examples of the method, apparatus, and non-transitory computer-readable medium described above may further include processes, features, means, or instructions for identifying a spectrum band for reception of the signal, wherein identifying the tone spacing may be based at least in part on the identified spectrum band.

Some examples of the method, apparatus, and non-transitory computer-readable medium described above may further include processes, features, means, or instructions for identifying a second tone spacing from the plurality of available tone spacings. Some examples of the method, apparatus, and non-transitory computer-readable medium described above may further include processes, features, means, or instructions for determining a second number of symbols of a second signal based at least in part on the identified second tone spacing, or the received signaling information, or a combination thereof. Some examples of the method, apparatus, and non-transitory computer-readable medium described above may further include processes, features, means, or instructions for identifying a second spectrum band for reception of the second signal, wherein identifying the second tone spacing may be based at least in part on the identified second spectrum band.

Some examples of the method, apparatus, and non-transitory computer-readable medium described above may further include processes, features, means, or instructions for determining a symbol duration for each of the number of symbols, wherein receiving the signal may be based at least in part on the determined symbol duration.

In some examples of the method, apparatus, and non-transitory computer-readable medium described above, the signal comprises one of a beam refinement reference signal, a primary synchronization signal, a secondary synchronization signal, a physical broadcast channel, a random access channel, a scheduling request channel, an extended synchronization signal, a beam reference signal, an extended physical broadcast channel, a physical downlink control channel, or a physical uplink control channel.

In some examples of the method, apparatus, and non-transitory computer-readable medium described above, the control channel comprises a radio resource control channel, a physical downlink control channel, a synchronization channel, a physical uplink control channel, a physical uplink shared channel, or a broadcast channel.

In some examples of the method, apparatus, and non-transitory computer-readable medium described above, receiving the signaling information via the physical downlink control channel comprises: obtaining reserved bits in downlink control information that convey the number of symbols.

Some examples of the method, apparatus, and non-transitory computer-readable medium described above may further include processes, features, means, or instructions for determining the number of symbols may be based at least in part on a carrier frequency associated with the spectrum band.

Some examples of the method, apparatus, and non-transitory computer-readable medium described above may further include processes, features, means, or instructions for determining a receiver algorithm associated with the first signal based at least in part on the determined tone spacing.

DETAILED DESCRIPTION

Some wireless communications systems (e.g., a Long Term Evolution (LTE)/LTE-Advanced (LTE-A) system or a millimeter wave (mmW) system) may employ a fixed tone spacing for all spectrum bands supported by the system. For instance, in an LTE/LTE-A system, the tone spacing may be the reciprocal of the symbol duration and may be selected in order to avoid or mitigate blurring caused by the Doppler shift and to maintain orthogonality between tones.

As the center frequency of different spectrum bands increases, however, having a higher tone spacing may help mitigate phase noise experienced when communicating at higher frequencies. Accordingly, in some examples, a wireless communications system may support spectrum bands having different tone spacings. The tone spacing may be predetermined or based on each spectrum band. Additionally or alternatively, the tone spacing may be dictated by the type of signal to be communicated. For example, some control channels may be transmitted using a first tone spacing, while some reference signals may be transmitted using a second tone spacing different from the first tone spacing used for transmission of the control channels.

In some examples, a number of repetitions, a number of symbols, or a symbol duration associated with transmission of a signal may be determined based on the tone spacing. The number of repetitions may be used to determine how many times a signal is transmitted using resources allocated for transmission, while the number of symbols and the symbol duration may be used to determine the number of symbols and the length of each symbol that the signal transmission spans.

In some examples, the number of repetitions, number of symbols, or symbol duration may be indicated to a user equipment (UE) by a base station. For instance, the number of repetitions, number of symbols, or symbol duration may be transmitted to the UE using a radio resource control (RRC) channel or a physical downlink control channel (PDCCH). In some instances, indication of the number of repetitions, number of symbols, or symbol duration may be transmitted to the UE using reserved bits of downlink control information (DCI) of a PDCCH.

Accordingly, aspects of the disclosure are initially described in the context of a wireless communication system. Aspects of the disclosure are further illustrated by and described with reference to apparatus diagrams, system diagrams, and flowcharts that relate to numerology dependent signal transmission.

Figure 1:
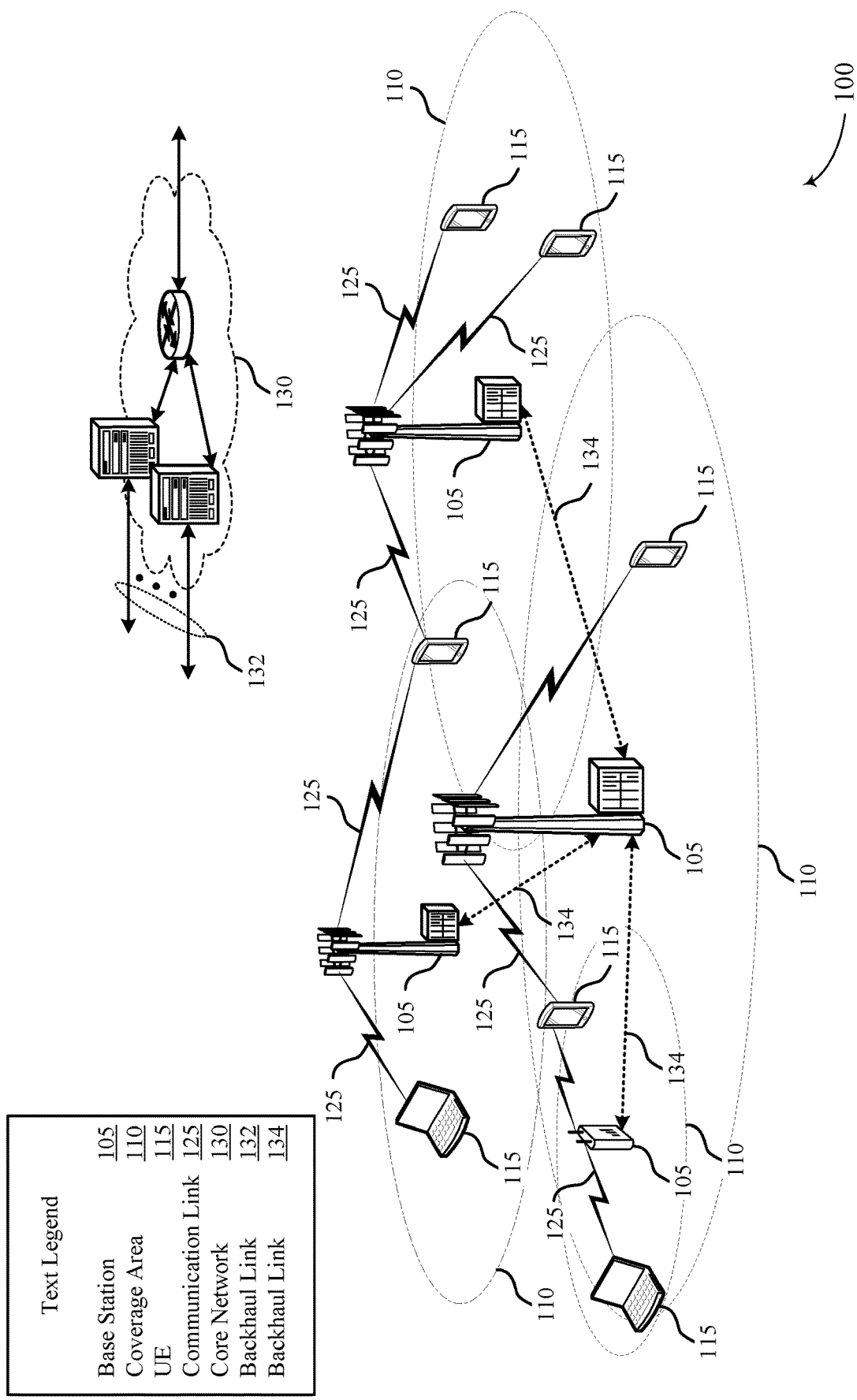
FIG. 1 illustrates an example of a system for wireless communication that supports numerology dependent signal transmission in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE (or LTE-A) system. The wireless communications system 100 may support numerology dependent signal transmissions by varying tone spacing based on spectrum band or signal type, for instance. In some examples, the wireless communications system 100 may support communication using a number of repetitions, a number of symbols, or a symbol duration determined based on the tone spacing or signaling information of a control channel (e.g., a PDCCH or a radio resource control (RRC) channel).

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine-type communication (MTC) device, an Internet of Things (IoT) device, etc. In one aspect, a UE 115 may be a device that includes a Universal Integrated Circuit Card (UICC). In another aspect, a UE 115 may be a device that does not include a UICC but nevertheless may have much of the same functionalities as a mobile station or mobile terminal.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include CDMA systems, TDMA systems, FDMA systems, and OFDMA systems. A wireless multiple-access communications system may include a number of base stations, each simultaneously supporting communication for one or more multiple communication devices, which may be otherwise known as a UE.

Figure 2:
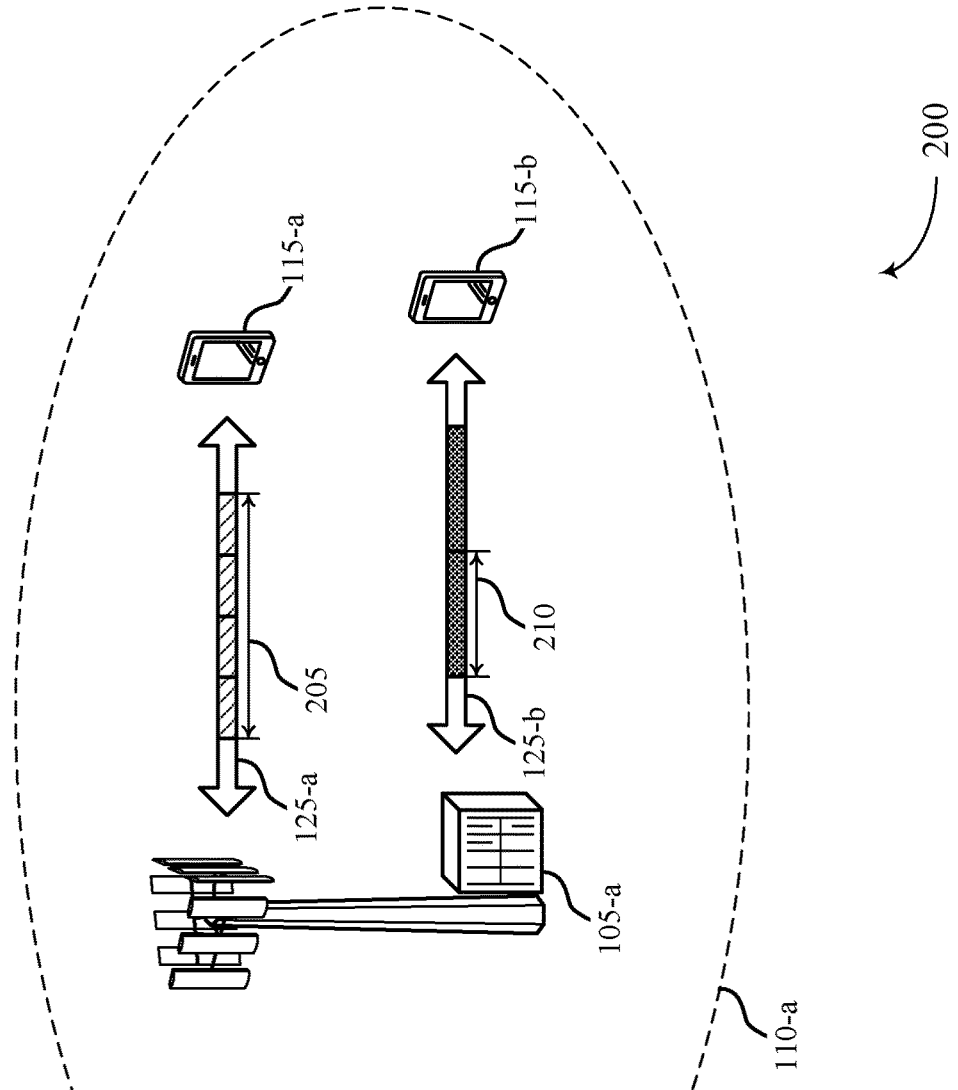
FIG. 2 illustrates an example of a system for wireless communication that supports numerology dependent signal transmission in accordance with aspects of the present disclosure.

FIG. 2 illustrates an example of a wireless communications system 200 for numerology dependent signal transmission. In some cases, wireless communications system 200 may represent aspects of techniques performed by a UE 115 or base station 105 as described with reference to FIG. 1. The wireless communications system 200 may include a base station 105-a that supports communication with multiple UEs 115-a and 115-b over a coverage area 110-a.

As shown, base station 105-a supports bi-directional communication with UE 115-a over communication link 125-a. Communication link 125-a may be associated with a first spectrum band. In DL communication, for example, base station 105-a may transmit a signal to UE 115-a using resources 205 (e.g., time, frequency). In some examples, resources 205 may represent a nominal symbol associated with communication link 125-a. A nominal symbol may refer to a symbol duration associated with the first spectrum band. For example, in an LTE/LTE-A communications system, a nominal symbol may span a duration of 66.7 microseconds (μs) and may be associated with a tone spacing of 15 kilohertz (kHz). It should be understood that 66.7 μs and 15 kHz described herein are for purposes of example only and a nominal symbol may span other durations or may be associated with other tone spacings without departing from the scope of the present disclosure.

In some examples, in order to support communication with UE 115-a over communication link 125-a, a base station 105-a may determine a number of repetitions for a signal to be transmitted using resources 205. In this example, the number of repetitions for transmission may be determined to be four and the signal may be transmitted four times using resources 205, as shown. Each transmission in this case would have a symbol duration that is one quarter of the duration associated with resources 205.

Base station 105-a also supports communication with UE 115-b over communication link 125-b. Communication link 125-b may be associated with a second spectrum band different from the first spectrum band associated with communication link 125-a. In DL communication, for example, base station 105-a may transmit a signal to UE 115-b using resources 210. In this case, resources 210 may represent a nominal symbol associated with communication link 125-b. In order to support communication with UE 115-b over communication link 125-b, the base station 105-a may determine a number of symbols to be used for transmission based on resources 210. In this example, the signal spans two nominal symbols. In some examples, tone spacing, symbol duration, or nominal symbol duration associated with resources 210 may be different from the tone spacing, symbol duration, or nominal symbol duration associated with resources 205.

Figure 3A:
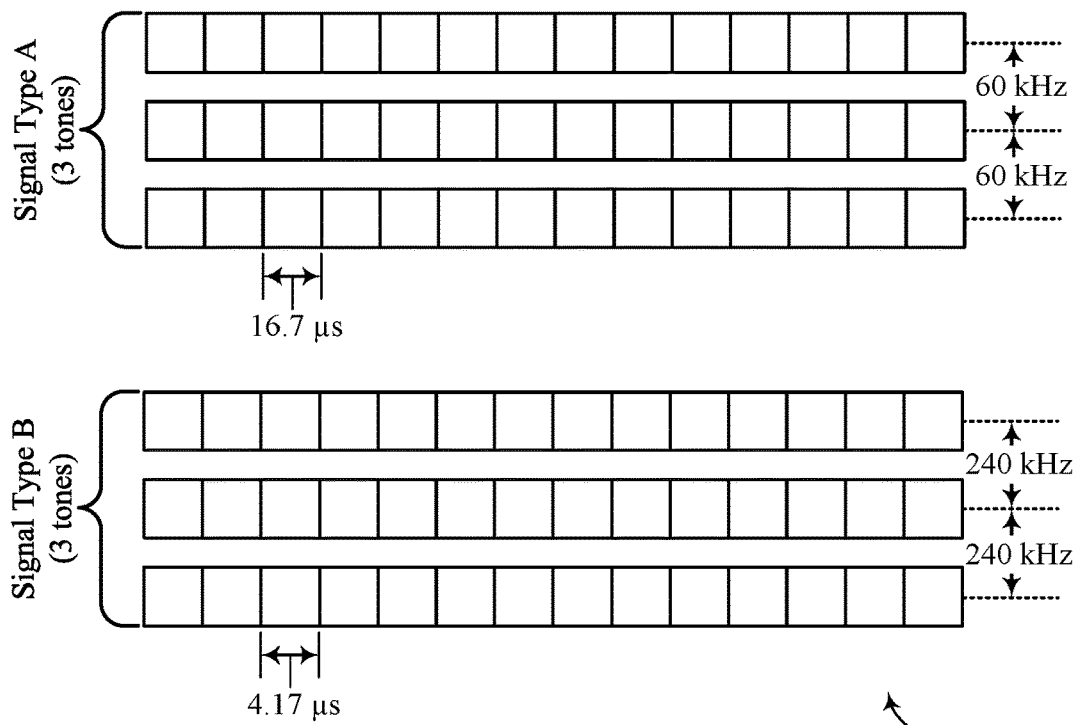
FIGS. 3A and 3B illustrate examples of sub-carriers that support numerology dependent signal transmission in accordance with aspects of the present disclosure.
Figure 3B:
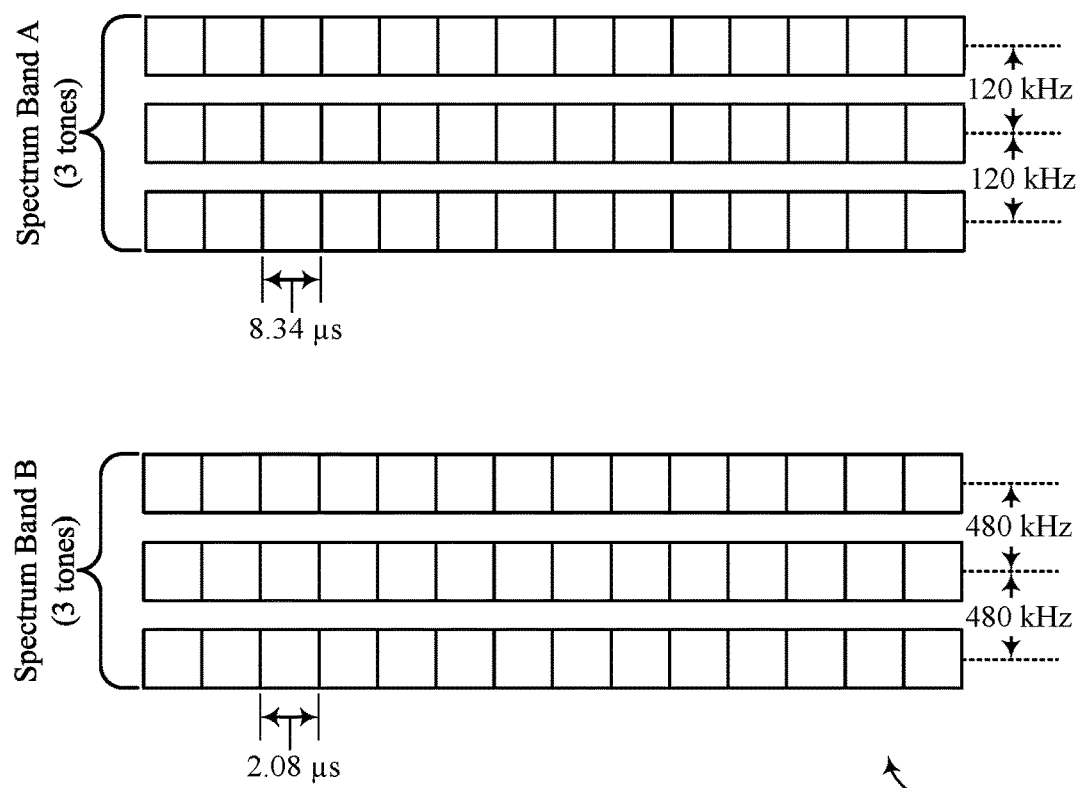

FIGS. 3A and 3B illustrate examples of sub-carriers 301 and 302 and corresponding spacings that support numerology dependent signal transmission. In some cases, sub-carriers 301 and 302 may represent aspects of techniques performed by a UE 115 or base station 105 as described with reference to FIGS. 1 and 2. As shown in FIGS. 3A and 3B, tone spacing as well as nominal symbol duration may vary based on signal type or spectrum band.

In FIG. 3A, Signal Type A may be associated with a tone spacing of 60 kHz and may include a control signal (e.g., a PDCCH, an RRC channel), a data signal, or an overhead signal (e.g., a channel state information reference signal (CSI-RS)). Signal Type B may be associated with a tone spacing of 240 kHz and may include a synchronization signal (e.g., a primary synchronization signal (PSS), a secondary synchronization (SSS)), an extended synchronization signal (ESS)), a physical broadcast channel (PBCH), a random access channel (RACH), a scheduling request channel, a beam reference signal (BRS), an extended PBCH, or a beam refinement reference signal (BRRS)).

Signal Type A may have a corresponding nominal symbol duration based on the tone spacing. For example, Signal Type A may have a nominal symbol duration of the reciprocal of the tone spacing which is 16.7 μs in this example. Signal Type B may have a corresponding nominal symbol duration based on the tone spacing, which also may be related to the reciprocal of the tone spacing resulting in a nominal symbol duration of 4.17 μs.

To support transmission of a Signal Type B using the sub-carriers 301 of Signal Type A, a fixed scaling factor may be used based on the tone spacing of Signal Type B. For example, as the tone spacing of Signal Type B is four times the tone spacing of Signal Type A, a Signal Type B may be transmitted four times within the nominal symbol duration of 16.7 μs associated with Signal Type A.

In FIG. 3B, Spectrum Band A may be associated with a tone spacing of 120 kHz and associated with a first carrier frequency. Spectrum Band A may be used for communication of a control signal (e.g., a PDCCH, an RRC channel), a data signal, or an overhead signal (e.g., a CSI-RS).

Spectrum Band B may be associated with a tone spacing of 480 kHz and may be used for communication of a synchronization signal (e.g., a PSS, an SSS), a RACH, a scheduling request channel, a BRS, an extended PBCH, or a BRRS.

Spectrum Band A may have a corresponding nominal symbol duration based on the tone spacing. For example, Spectrum Band A may have a nominal symbol duration of the reciprocal of the tone spacing which is 8.34 μs in this example. Spectrum Band B may have a corresponding nominal symbol duration based on the tone spacing, which also may be related to the reciprocal of the tone spacing resulting in a nominal symbol duration of 2.08 μs.

To support transmission on a Spectrum Band B using the sub-carriers 302 of Spectrum Band A, a fixed scaling factor may be used based on the tone spacing of Spectrum Band B. For example, as the tone spacing of Spectrum Band B is four times the tone spacing of Spectrum Band A, a signal transmitted using Spectrum Band B may be transmitted four times within the nominal symbol duration of 8.34 μs associated with Spectrum Band A.

In some cases, however, the symbol duration associated with Spectrum Band B may be too short for a receiver (such as UE 115) to successfully receive the signal and thus, a fixed scaling factor may be inadequate for such transmissions. To account for this, a number of repetitions, a number of symbols, and a symbol duration may be determined based on tone spacing, rather than using a fixed scaling factor for all signal types and for all supported spectrum bands.

It should be understood that the tone spacings and symbols durations described above with reference to FIGS. 3A and 3B are for purposes of example only and other tone spacings or symbol durations may be considered without departing from the scope of the present disclosure.

Figure 4:
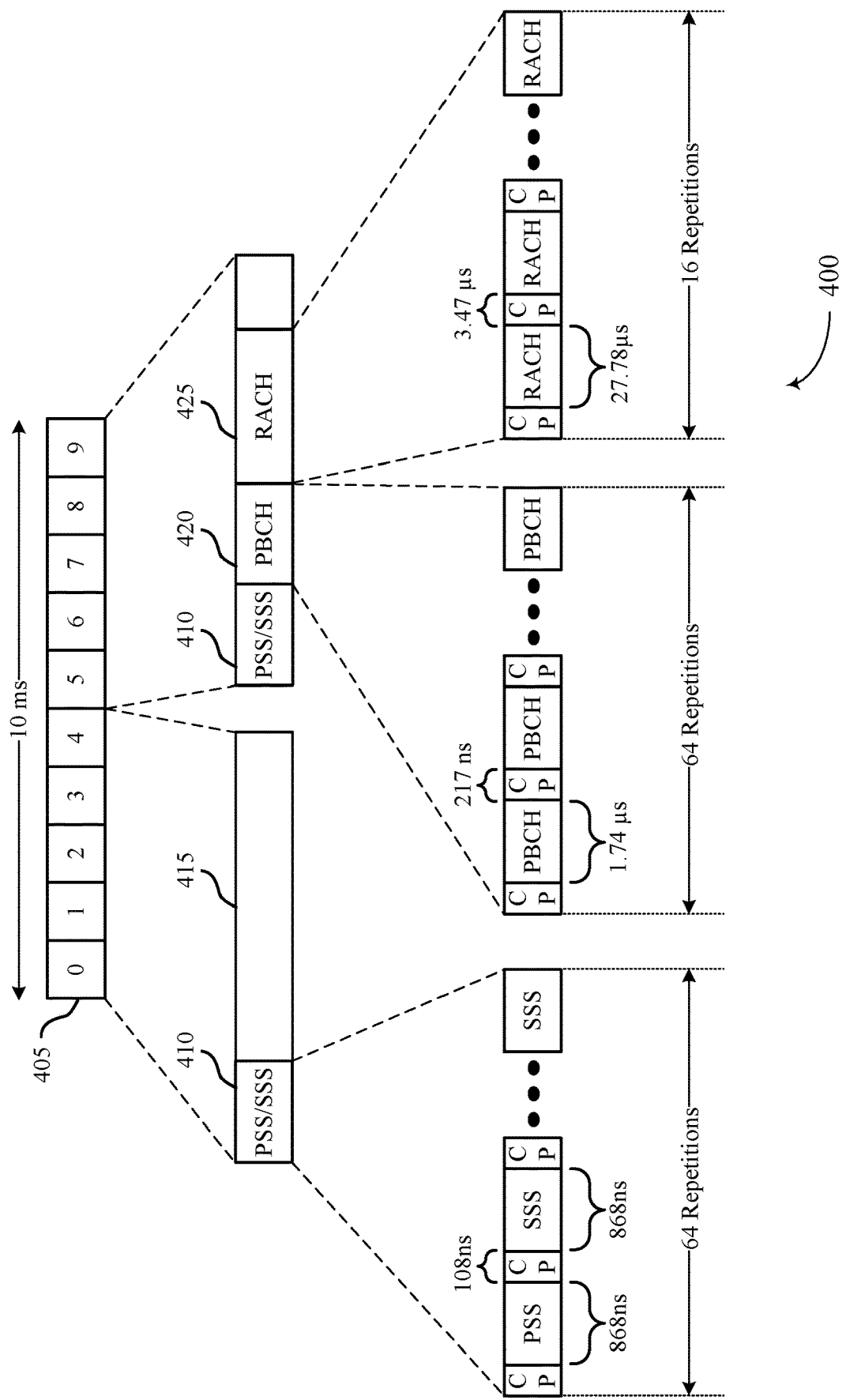
FIG. 4 illustrates an example frame structure that supports numerology dependent signal transmission in accordance with aspects of the present disclosure.

FIG. 4 illustrates an example of a frame structure 400 for numerology dependent signal transmission. In some cases, frame structure 400 may represent aspects of techniques performed by a UE 115 or base station 105 as described with reference to FIGS. 1, 2, 3A and 3B. In FIG. 4, a radio frame 405 spans 10 ms and includes 10 subframes (0 through 9) of 1 ms each. In this example, radio frame 405 may be associated with a carrier frequency and may span one or more tones having a given tone spacing. For example, the tone spacing may correspond to a particular spectrum band or wireless communication system such as an LTE/LTE-A or an mmW system. For example, the tone spacing may be identified as 288 kHz having a corresponding nominal symbol duration of 3.47 μs.

The radio frame 405 may include resources allocated for transmission of synchronization signals such as PSS/SSS 410. For example, the radio frame 405 may allocate 125 μs for PSS/SSS 410. The radio frame 405 may also include resources allocated for transmission of other signals 415 such as data or overhead signals. Also as shown, the radio frame 405 may include resources allocated for a PBCH 420 and a RACH 425. For example, the PBCH may be allocated 125 μs and the RACH may be allocated 500 μs.

The repetition of PSS/SSS helps the UE to change its subarray during each transmission and find the best subarray after several repetitions. Based on the tone spacing of 288 kHz, a number of repetitions and a number of symbols for transmission of PSS/SSS 410 signals may be determined. For example, the combination of the PSS and the SSS may be associated with a scale factor of four due to the tone spacing associated with PSS and SSS signals. For example, the tone spacing associated with PSS and SSS signals may be four times greater than the tone spacing associated with radio frame 405 and each of the PSS and SSS may be determined to be a quarter of the nominal symbol duration (or 868 nanoseconds (ns)). A cyclic prefix (CP) associated with each transmission of the PSS and the SSS may also be included and based on the determined symbol duration for the PSS or the SSS (in this case, 108 ns). As the PSS/SSS 410 was allocated 125 μs, it may be determined that the PSS/SSS sequence is repeated 64 times based on the determined tone spacing of the radio frame 405 and the tone spacing associated with the PSS/SSS 410.

Similarly, as the tone spacing of 288 kHz is associated with radio frame 405, a number of repetitions and a number of symbols for transmission of PBCH signals may be determined. For example, the PBCH 420 may be associated with a scale factor of four based on the tone spacing associated with the PBCH 420. For example, the tone spacing associated with the PBCH 420 may be two times greater than the tone spacing associated with radio frame 405 and it may be determined that the PBCH is to be transmitted over half of the nominal symbol duration (or 1.74 μs). A CP associated with each transmission of the PBCH may also be included and based on the determined symbol duration for the PBCH (in this case, 217 ns). As the PBCH 420 was allocated 125 μs, it may be determined that the PBCH sequence is repeated 64 times based on the determined tone spacing of the radio frame 405 and the tone spacing associated with the PBCH 420.

Using the tone spacing of 288 kHz, a number of repetitions and a number of symbols for transmission of RACH signals may be determined. For example, the RACH 425 may be associated with a scale factor of one eighth based on the tone spacing associated with the RACH 425. For example, the tone spacing associated with the RACH 425 may be eight times less than the tone spacing associated with radio frame 405 and it may be determined that the RACH 425 is to be transmitted over eight nominal symbol durations (or 27.78 μs). A CP associated with each transmission of the RACH 425 may also be included and based on the determined symbol duration for the RACH 425 (in this case, 3.47 μs). As the RACH 425 was allocated 500 μs, it may be determined that the RACH sequence is repeated 16 times based on the determined tone spacing of the radio frame 405 and the tone spacing associated with the RACH 425.

It should be understood that the tone spacings and symbols durations described above with reference to FIG. 4 are for purposes of example only and other tone spacings or symbol durations may be considered without departing from the scope of the present disclosure.

Figure 5:
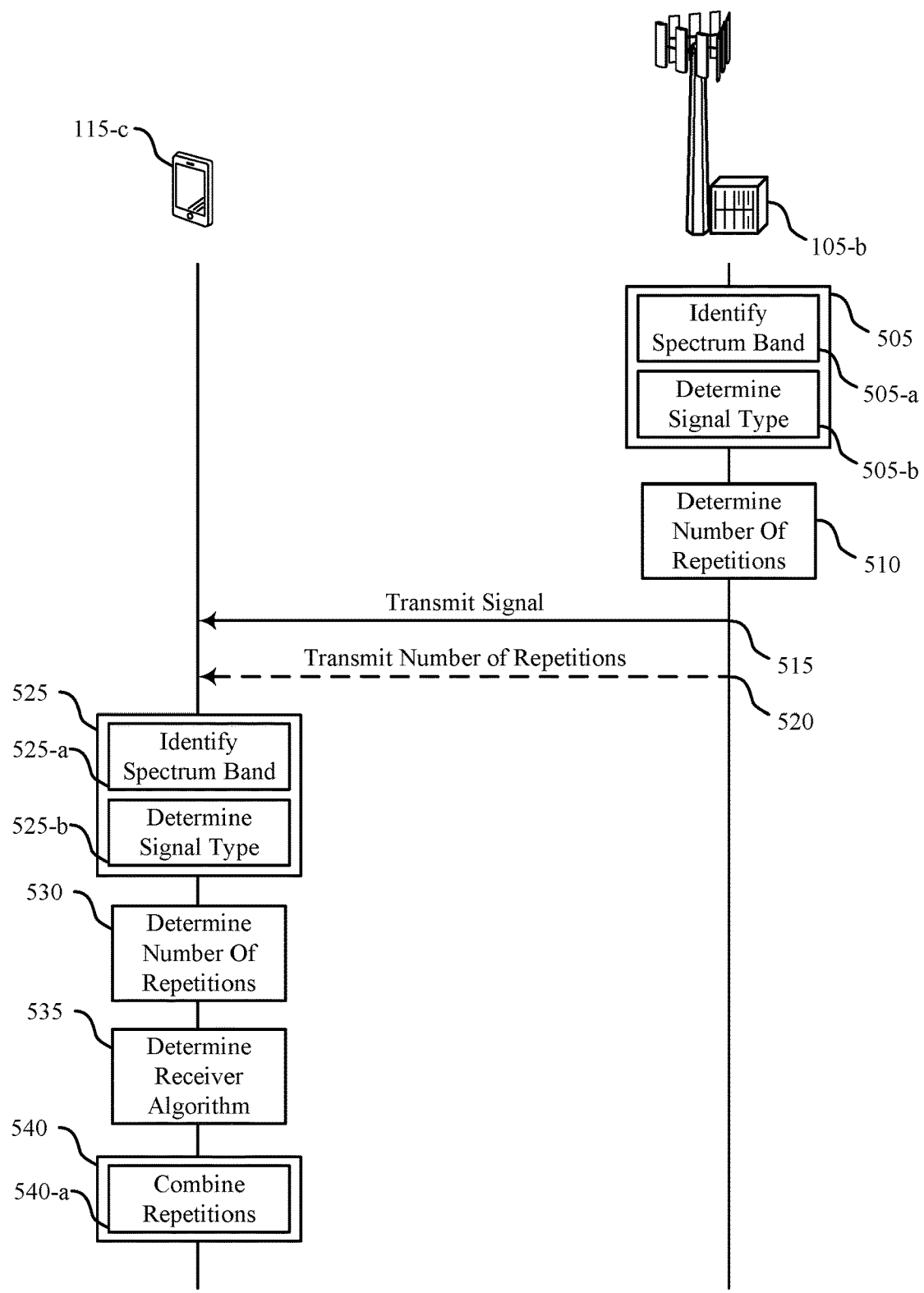
FIG. 5 illustrates an example of a process flow for numerology dependent signal transmission in accordance with aspects of the present disclosure.

FIG. 5 illustrates an example of a process flow 500 for numerology dependent signal transmission. In some cases, process flow 500 may represent aspects of techniques performed by a UE 115 or base station 105 as described with reference to FIGS. 1, 2, 3A, 3B, and 4.

At 505, base station 105-b identifies a tone spacing for transmission of a signal. To identify the tone spacing, the base station 105-b may identify a spectrum band associated with transmission of the signal at 505-a. The base station 105-b may also determine a signal type associated with the signal at 505-b in order to identify the tone spacing for transmission. Based on the identified tone spacing, the base station 105-b may determine a number of repetitions for transmission of the signal at 510. The number of transmissions may relate to the number of times the signal is to be transmitted over resources allocated for transmission of the signal. The number of repetitions may be based on the determined signal type or the identified spectrum band, or may be based on signaling information of a control channel (RRC, PDCCH, PUCCH). Each of the number of repetitions may also be associated with a duration for transmission of each of the repetitions (i.e., a symbol duration). The duration of the transmission may span multiple nominal symbol durations associated with the identified spectrum band or the determined signal type.

At 515, the base station 105-b transmits the signal to UE 115-c based on the identified tone spacing and the determined number of repetitions. For example, the base station 105-b may transmit the signal multiple times to UE 115-c over resources allocated for communication between the base station 105-b and the UE 115-c. Optionally, at 520, the base station 105-b may transmit a signal to the UE 115-c indicating the number of repetitions, the identified tone spacing, or the determined signal type. For example, the base station 105-b may transmit an indication to the UE 115-c using an RRC channel or a PDCCH. In some examples, the base station 105-b may reserve bits in downlink control information to be transmitted to the UE 115-c using the PDCCH.

At 525, the UE 115-c identifies the tone spacing associated with reception of the signal. The tone spacing may be identified by identifying the spectrum band at 525-a associated with the signal. The tone spacing may also be identified based on determining a signal type associated with the signal at 525-b. Using the identified tone spacing, the UE 115-c may determine a number of repetitions associated with reception of the signal at 530. Based on the number of repetitions, the UE 115-c may then determine a receiver algorithm at 525. The determined receiver algorithm may also be based on the identified tone spacing. The receiver algorithm may be used to determine how a receiver should receive the signal transmitted by the base station 105-*b*.

At 540, the UE 115-*c* receives the signal transmitted by the base station and in some examples, the UE 115-*c* combines multiple repetitions at 540-*a* of the transmitted signal based on the determined number of repetitions or the determined receiver algorithm, or a combination thereof.

While FIG. 5 illustrates a number of processes, it should be understood that not all of the steps in process flow 500 need to be performed or various steps may be performed simultaneously or in a different order than shown and described above.

Figure 6:
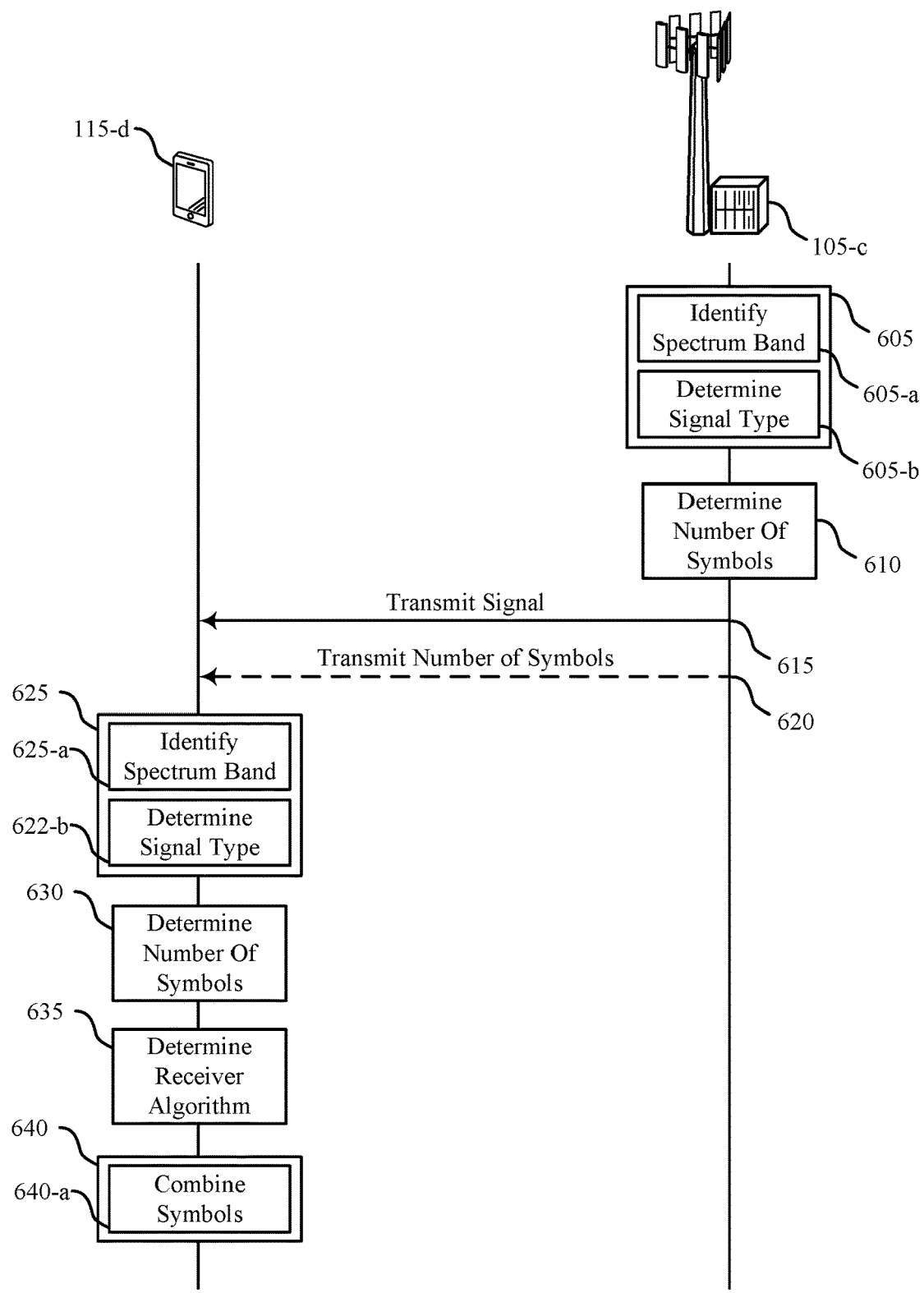
FIG. 6 illustrates an example of a process flow for numerology dependent signal transmission in accordance with aspects of the present disclosure.

FIG. 6 illustrates an example of a process flow 600 for numerology dependent signal transmission. In some cases, process flow 600 may represent aspects of techniques performed by a UE 115 or base station 105 as described with reference to FIGS. 1, 2, 3A, 3B, and 4.

At 605, base station 105-*c* identifies a tone spacing for transmission of a signal. To identify the tone spacing, the base station 105-*c* may identify a spectrum band associated with transmission of the signal at 605-*a*. The base station 105-*c* may also determine a signal type associated with the signal at 605-*b* in order to identify the tone spacing for transmission. Based on the identified tone spacing, the base station 105-*c* may determine a number of symbols for transmission of the signal at 610. The number of symbols may relate to the number of symbols used to transmit the signal over resources allocated for transmission of the signal. The number of symbols may be based on the determined signal type or the identified spectrum band, or may be based on signaling information of a control channel (RRC, PDCCH, PUCCH). Each of the number of symbols may also be associated with a duration for transmission of each of the symbols (i.e., a symbol duration). The duration of the transmission may span multiple nominal symbol durations associated with the identified spectrum band or the determined signal type.

At 615, the base station 105-*c* transmits the signal to UE 115-*d* based on the identified tone spacing and the determined number of symbols. For example, the base station 105-*c* may transmit the signal over multiple symbols to UE 115-*d* using resources allocated for communication between the base station 105-*c* and the UE 115-*d*. Optionally, at 620, the base station 105-*c* may transmit a signal to the UE 115-*d* indicating the number of symbols, the identified tone spacing, or the determined signal type. For example, the base station 105-*c* may transmit an indication to the UE 115-*d* using an RRC channel or a PDCCH. In some examples, the base station 105-*c* may reserve bits in downlink control information to be transmitted to the UE 115-*d* using the PDCCH.

At 625, the UE 115-*d* identifies the tone spacing associated with reception of the signal. The tone spacing may be identified by identifying the spectrum band at 625-*a* associated with the signal. The tone spacing may also be identified based on determining a signal type associated with the signal at 625-*b*. Using the identified tone spacing, the UE 115-*d* may determine a number of symbols associated with reception of the signal at 630. Based on the number of symbols, the UE 115-*d* may then determine a receiver algorithm at 625. The determined receiver algorithm may also be based on the identified tone spacing. The receiver algorithm may be used to determine how a receiver should receive the signal transmitted by the base station 105-*c*.

At 640, the UE 115-*d* receives the signal transmitted by the base station and in some examples, the UE 115-*d* combines multiple symbols at 640-*a* of the transmitted signal based on the determined number of repetitions or the determined receiver algorithm, or a combination thereof.

While FIG. 6 illustrates a number of processes, it should be understood that not all of the steps in process flow 600 need to be performed or various steps may be performed simultaneously or in a different order than shown and described above.

Figure 7:
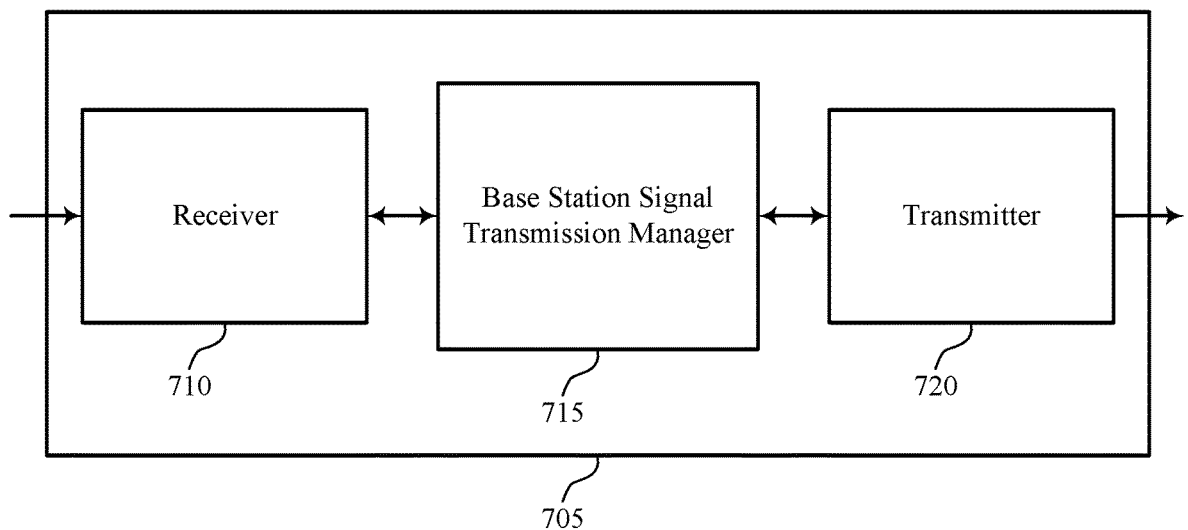
FIGS. 7 through 9 show block diagrams of a wireless device that supports numerology dependent signal transmission in accordance with aspects of the present disclosure.

FIG. 7 shows a block diagram 700 of a wireless device 705 that supports numerology dependent signal transmission in accordance with various aspects of the present disclosure. Wireless device 705 may be an example of aspects of a base station 105 as described with reference to FIGS. 1, 2, 5, and 6. Wireless device 705 may include receiver 710, base station signal transmission manager 715, and transmitter 720. Wireless device 705 may also include a processor. Each of these components may be in communication with one another (e.g., via one or more buses).

The receiver 710 may receive information such as packets, user data, or control information associated with various information channels (e.g., control channels, data channels, and information related to numerology dependent signal transmission, etc.). Information may be passed on to other components of the device. The receiver 710 may be an example of aspects of the transceiver 1040 described with reference to FIG. 10.

The base station signal transmission manager 715 may be an example of aspects of the base station signal transmission manager 1015 described with reference to FIG. 10.

The base station signal transmission manager 715 may identify a tone spacing from a set of available tone spacings, determine a first number of repetitions of a first signal based on the identified tone spacing, or based on signaling information of a control channel (RRC, PDCCH, PUCCH), transmit the first signal based on the determined first number of repetitions and the identified tone spacing, determine a number of symbols to be used in a subframe for transmission of a signal based on the identified tone spacing, and transmit the signal based on the determined number of symbols and the identified tone spacing.

The transmitter 720 may transmit signals generated by other components of the device. In some examples, the transmitter 720 may be collocated with a receiver 705 in a transceiver module. For example, the transmitter 720 may be an example of aspects of the transceiver 1040 described with reference to FIG. 10. The transmitter 720 may include a single antenna, or may include a set of antennas.

Figure 8:
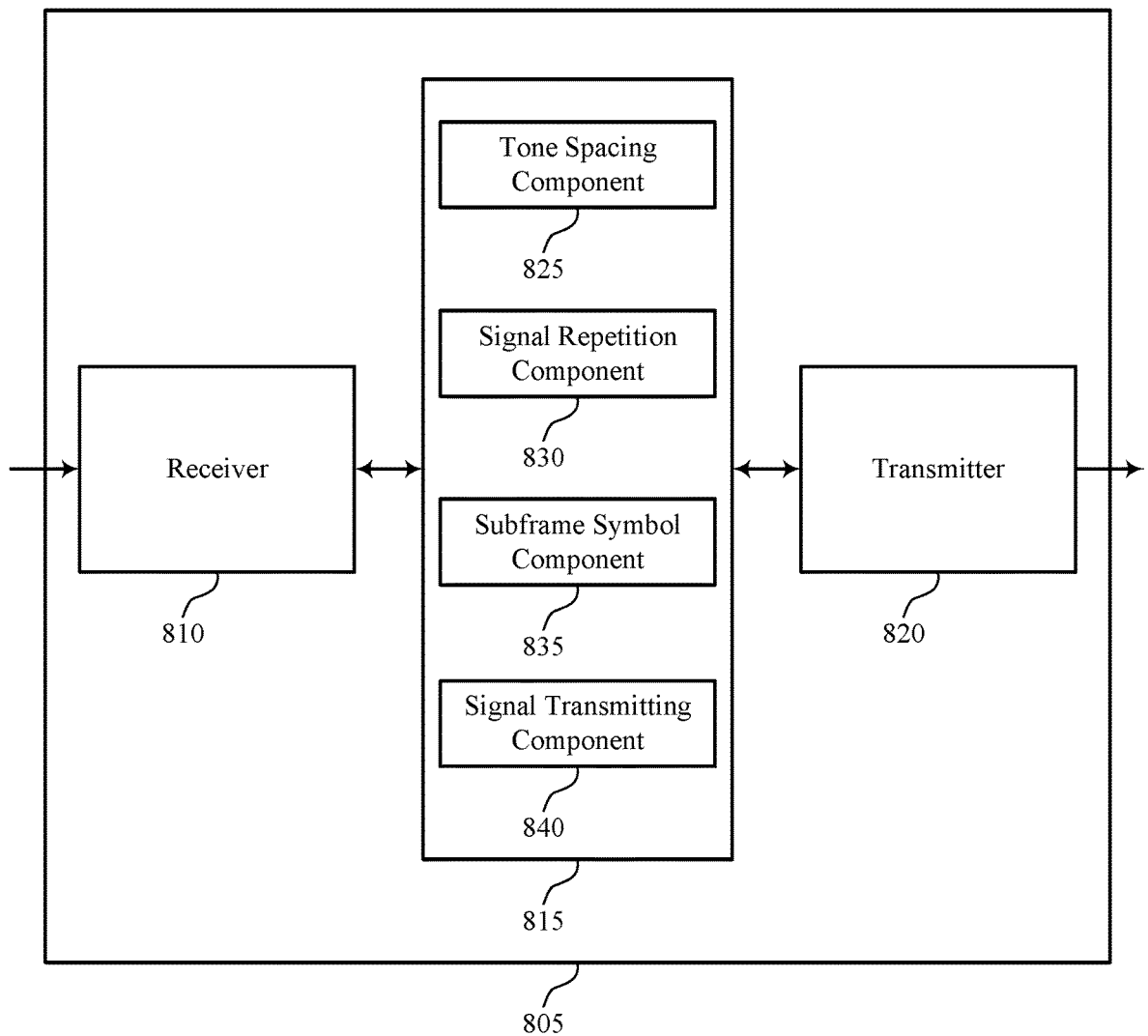

FIG. 8 shows a block diagram 800 of a wireless device 805 that supports numerology dependent signal transmission in accordance with various aspects of the present disclosure. Wireless device 805 may be an example of aspects of a wireless device 705 or a base station 105 as described with reference to FIGS. 1, 2, and 5-7. Wireless device 805 may include receiver 810, base station signal transmission manager 815, and transmitter 820. Wireless device 805 may also include a processor. Each of these components may be in communication with one another (e.g., via one or more buses).

The receiver 810 may receive information such as packets, user data, or control information associated with various information channels (e.g., control channels, data channels, and information related to numerology dependent signal transmission, etc.). Information may be passed on to other components of the device. The receiver 810 may be an example of aspects of the transceiver 1040 described with reference to FIG. 10.

The base station signal transmission manager 815 may be an example of aspects of the base station signal transmission manager 1015 described with reference to FIG. 10. The base station signal transmission manager 815 may also include tone spacing component 825, signal repetition component 830, subframe symbol component 835, and signal transmitting component 840.

The tone spacing component 825 may identify a tone spacing from a set of available tone spacings, identify a second tone spacing from the set of available tone spacings, and identify the tone spacing based on the determined signal type.

The signal repetition component 830 may determine a first number of repetitions of a first signal based on the identified tone spacing, or based on signaling information of a control channel (RRC, PDCCH, PUCCH), determine a second number of repetitions of a second signal based on the determined second tone spacing, or based on signaling information of a control channel (RRC, PDCCH, PUCCH), where the determined second number of repetitions is different from the determined first number of repetitions, and determine the first number of repetitions is based on a carrier frequency of a spectrum band.

The subframe symbol component 835 may determine a number of symbols to be used in a subframe for transmission of a signal based on the identified tone spacing, or based on signaling information of a control channel (RRC, PDCCH, PUCCH), determine a second number of symbols of a second signal based on the determined second tone spacing, or based on signaling information of a control channel (RRC, PDCCH, PUCCH), and determine the number of symbols based on a carrier frequency associated with a spectrum band.

The signal transmitting component 840 may transmit the first signal based on the determined first number of repetitions and the identified tone spacing and transmit the signal based on the determined number of symbols and the identified tone spacing. In some cases, transmitting the first signal includes: transmitting an indication of the determined first number of repetitions using at least one of an RRC channel or a PDCCH. In some cases, transmitting the signal includes: transmitting an indication of the determined number of symbols using at least one of an RRC channel or a PDCCH. In some examples, the signal transmitting component 840 may perform any of the above transmissions in conjunction with transmitter 820 and in some cases, the signal transmitting component 840 may perform a portion of the above transmissions while the transmitter 820 performs other portion(s).

The transmitter 820 may transmit signals generated by other components of the device. In some examples, the transmitter 820 may be collocated with a receiver 805 in a transceiver module. For example, the transmitter 820 may be an example of aspects of the transceiver 1040 described with reference to FIG. 10. The transmitter 820 may include a single antenna, or may include a set of antennas.

Figure 9:
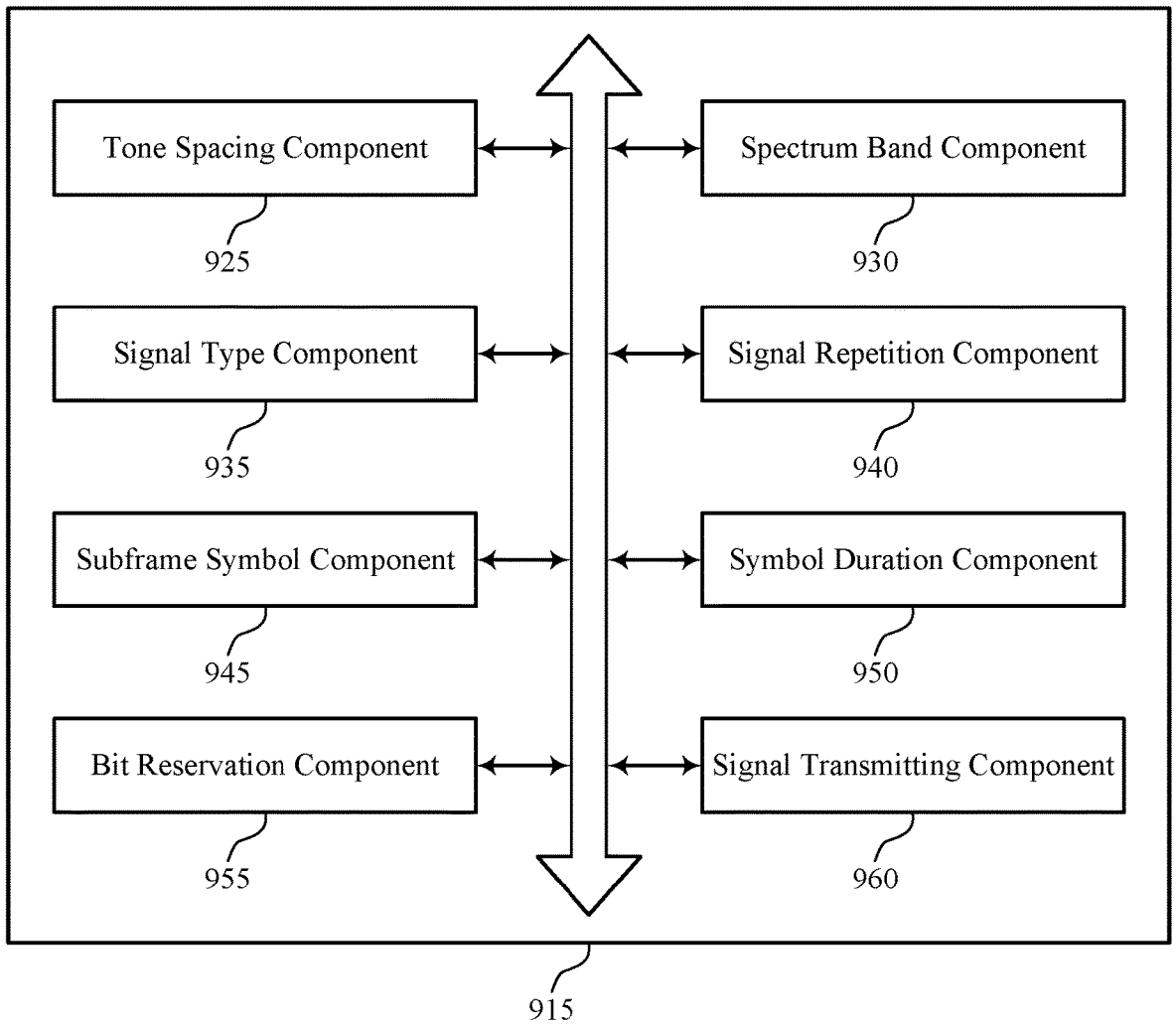

FIG. 9 shows a block diagram 900 of a base station signal transmission manager 915 that supports numerology dependent signal transmission in accordance with various aspects of the present disclosure. The base station signal transmission manager 915 may be an example of aspects of a base station signal transmission manager 715, a base station signal transmission manager 815, or a base station signal transmission manager 1015 described with reference to FIGS. 7, 8, and 10. The base station signal transmission manager 915 may include tone spacing component 925, spectrum band component 930, signal type component 935, signal repetition component 940, subframe symbol component 945, symbol duration component 950, bit reservation component 955, and signal transmitting component 960. Each of these modules may communicate, directly or indirectly, with one another (e.g., via one or more buses).

The tone spacing component 925 may identify a tone spacing from a set of available tone spacings, identify a second tone spacing from the set of available tone spacings, and identify the tone spacing based on the determined signal type.

The spectrum band component 930 may identify a spectrum band for transmission of the first signal, where identifying the tone spacing is based on the identified spectrum band. The spectrum band component 930 may identify a second spectrum band for transmission of the second signal, where identifying the second tone spacing is based on the identified second spectrum band. The spectrum band component 930 may identify a spectrum band for transmission of the signal, where identifying the tone spacing is based on the identified spectrum band, and identify a second spectrum band for transmission of the second signal, where identifying the second tone spacing is based on the identified second spectrum band.

The signal type component 935 may determine a signal type. In some cases, identifying the tone spacing includes: determining a signal type associated with the signal. In some cases, the signal type associated with the signal includes one of a BRRS, a PSS, a SSS, a PBCH, a PDCCH, or a PUCCH.

The signal repetition component 940 may determine a first number of repetitions of a first signal based on the identified tone spacing, determine a second number of repetitions of a second signal based on the determined second tone spacing, or based on signaling information of a control channel (RRC, PDCCH, PUCCH), where the determined second number of repetitions is different from the determined first number of repetitions, and determine the first number of repetitions based on a carrier frequency of a spectrum band.

The subframe symbol component 945 may determine a number of symbols to be used in a subframe for transmission of a signal based on the identified tone spacing, or based on signaling information of a control channel (RRC, PDCCH, PUCCH), identify a second tone spacing from the set of available tone spacings, determine a second number of symbols of a second signal based on the determined second tone spacing, or based on signaling information of a control channel (RRC, PDCCH, PUCCH), and determine the number of symbols based on a carrier frequency associated with a spectrum band.

The symbol duration component 950 may determine a symbol duration for each of the number of symbols, where transmitting the signal is based on the symbol duration.

The bit reservation component 955 may be used to reserve bits. In some cases, transmitting the first number of repetitions using a PDCCH includes: reserving bits in downlink control information to convey the first number of repetitions. In some cases, transmitting the number of symbols using a PDCCH includes: reserving bits in downlink control information to convey the number of symbols.

The signal transmitting component 960 may transmit the first signal based on the determined first number of repetitions and the identified tone spacing and transmit the signal based on the determined number of symbols and the identified tone spacing. In some cases, transmitting the first signal includes: transmitting an indication of the determined first number of repetitions using at least one of an RRC channel or a PDCCH. In some cases, transmitting the signal includes: transmitting an indication of the determined number of symbols using at least one of an RRC channel or a PDCCH.

Figure 10:
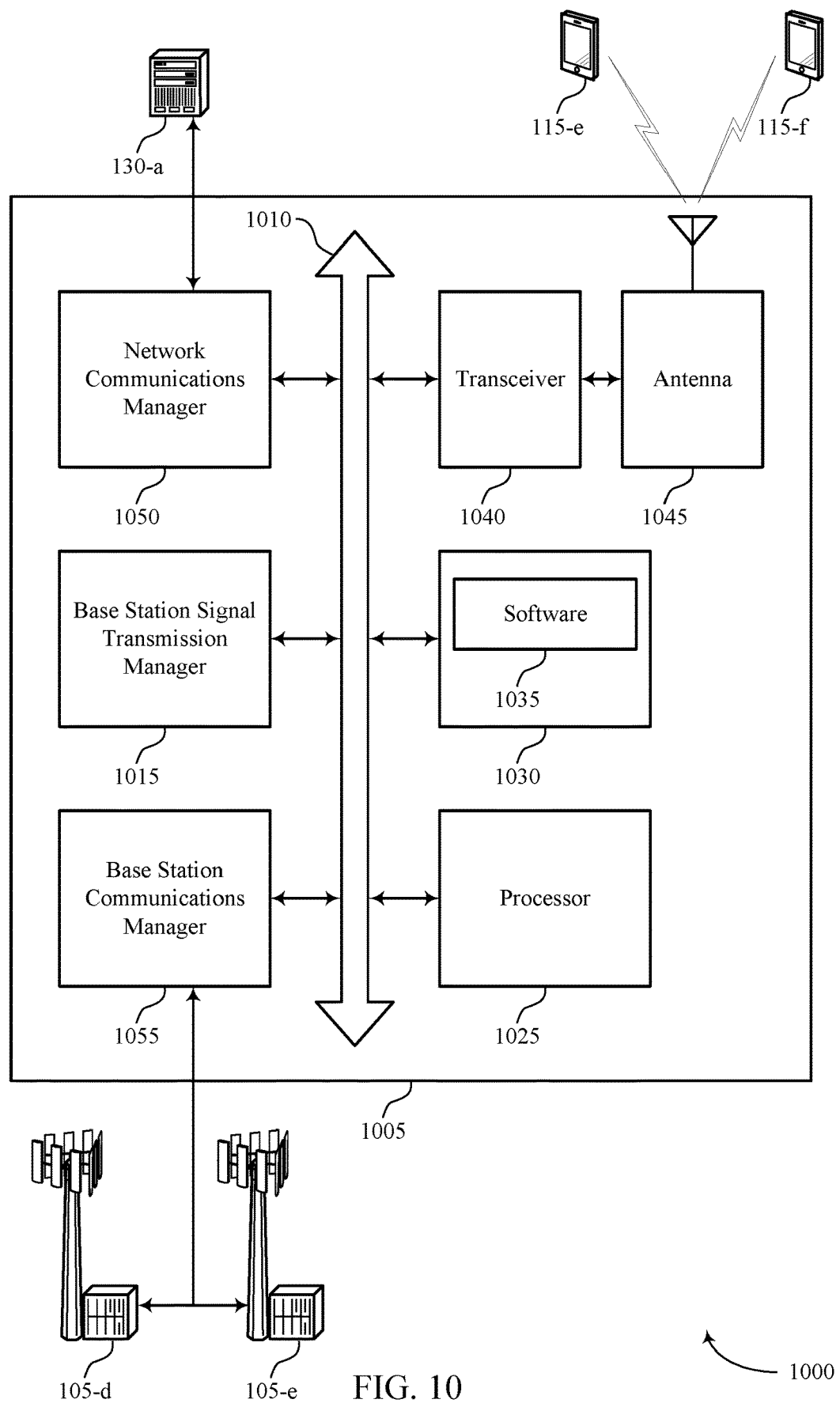
FIG. 10 illustrates a block diagram of a system including a base station that supports numerology dependent signal transmission in accordance with aspects of the present disclosure.

FIG. 10 shows a diagram of a system 1000 including a device 1005 that supports numerology dependent signal transmission in accordance with various aspects of the present disclosure. Wireless device 1005 may be an example of a wireless device 700, wireless device 800, or a base station 105 as described above, e.g., with reference to FIGS. 1, 2, 5, 6, 7 and 8.

Device 1005 may include components for bi-directional voice and data communications including components for transmitting and receiving communications, including base station signal transmission manager 1015, processor 1025, memory 1030, software 1035, transceiver 1040, antenna 1045, network communications manager 1050, and base station communications manager 1055.

The processor 1025 may include an intelligent hardware device, (e.g., a central processing unit (CPU), a microcontroller, an application specific integrated circuit (ASIC), etc.)

The memory 1030 may include random access memory (RAM) and read only memory (ROM). The memory 1030 may store computer-readable, computer-executable software 1035 including instructions that, when executed, cause the processor to perform various functions described herein. In some cases, the memory 1030 may contain, among other things, a Basic Input-Output system (BIOS) which may control basic hardware and/or software operation such as the interaction with peripheral components or devices.

Software 1035 may include code to implement aspects of the present disclosure, including code to support numerology dependent signal transmission. Software 1035 may be stored in a non-transitory computer-readable medium such as system memory or other memory. In some cases, the software 1035 may not be directly executable by the processor but may cause a computer (e.g., when compiled and executed) to perform functions described herein.

The transceiver 1040 may communicate bi-directionally, via one or more antennas, wired, or wireless links as described above. For example, the transceiver 1040 may represent a wireless transceiver and may communicate bi-directionally with another wireless transceiver. The transceiver 1040 may also include a modem to modulate the packets and provide the modulated packets to the antennas for transmission, and to demodulate packets received from the antennas.

In some cases, the device 1005 may include a single antenna 1045. However, in some cases the device may have more than one antenna 1045, which may be capable of concurrently transmitting or receiving multiple wireless transmissions.

The network communications manager 1050 may manage communications with the core network 130-a (e.g., via one or more wired backhaul links). For example, the network communications module 1050 may manage the transfer of data communications for client devices, such as one or more UEs 115-e and 115-f.

The base station communications manager 1055 may manage communications with other base station 105-d and 105-e, and may include a controller or scheduler for controlling communications with UEs 115-e and 115-f in cooperation with other base stations 105-d and 105-e. For example, the base station communications manager 1055 may coordinate scheduling for transmissions to UEs 115-e and 115-f for various interference mitigation techniques such as beamforming or joint transmission. In some examples, base station communications manager 1055 may provide an X2 interface within an LTE/LTE-A wireless communication network technology to provide communication between base stations 105-d and 105-e.

Figure 11:
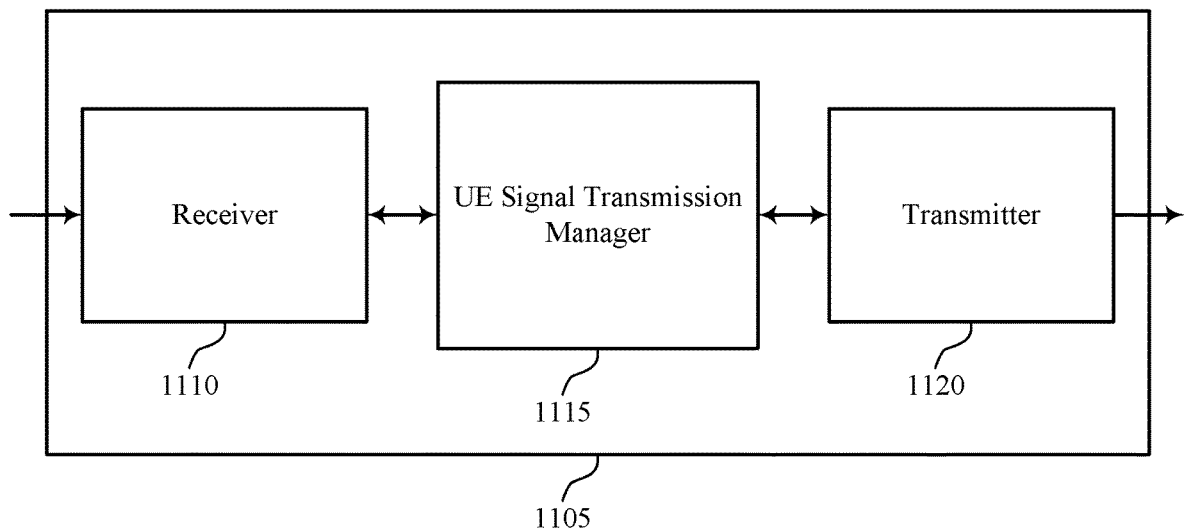
FIGS. 11 through 13 show block diagrams of a wireless device that supports numerology dependent signal transmission in accordance with aspects of the present disclosure.

FIG. 11 shows a block diagram 1100 of a wireless device 1105 that supports numerology dependent signal transmission in accordance with various aspects of the present disclosure. Wireless device 1105 may be an example of aspects of a UE 115 as described with reference to FIGS. 1, 2, 5, and 6. Wireless device 1105 may include receiver 1110, UE signal transmission manager 1115, and transmitter 1120. Wireless device 1105 may also include a processor. Each of these components may be in communication with one another (e.g., via one or more buses).

The receiver 1110 may receive information such as packets, user data, or control information associated with various information channels (e.g., control channels, data channels, and information related to numerology dependent signal transmission, etc.). Information may be passed on to other components of the device. The receiver 1110 may be an example of aspects of the transceiver 1440 described with reference to FIG. 14.

The UE signal transmission manager 1115 may be an example of aspects of the UE signal transmission manager 1415 described with reference to FIG. 14.

The UE signal transmission manager 1115 may identify a tone spacing from a set of available tone spacings, determine a first number of repetitions of a first signal based on the identified tone spacing, or based on signaling information of a control channel (RRC, PDCCH, PUCCH), receive the first signal based on the determined first number of repetitions and the identified tone spacing, determine a number of symbols to be used in a subframe for reception of a signal based on the identified tone spacing, or based on signaling information of a control channel (RRC, PDCCH, PUCCH), and receive the signal based on the determined number of symbols and the identified tone spacing.

The transmitter 1120 may transmit signals generated by other components of the device. In some examples, the transmitter 1120 may be collocated with a receiver 1105 in a transceiver module. For example, the transmitter 1120 may be an example of aspects of the transceiver 1440 described with reference to FIG. 14. The transmitter 1120 may include a single antenna, or may include a set of antennas.

Figure 12:
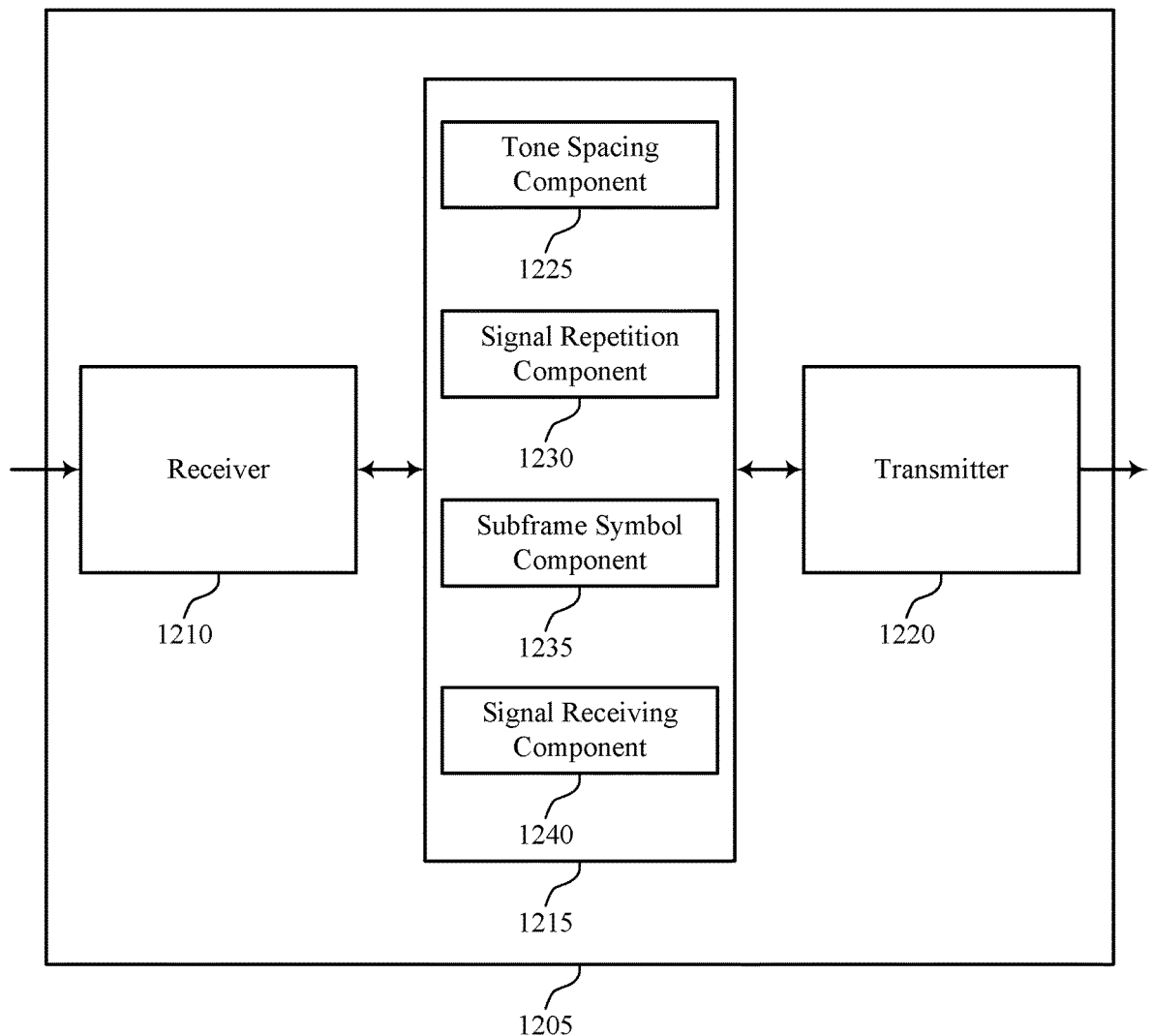

FIG. 12 shows a block diagram 1200 of a wireless device 1205 that supports numerology dependent signal transmission in accordance with various aspects of the present disclosure. Wireless device 1205 may be an example of aspects of a wireless device 1105 or a UE 115 as described with reference to FIGS. 1, 2, 5, 6, and 11. Wireless device 1205 may include receiver 1210, UE signal transmission manager 1215, and transmitter 1220. Wireless device 1205 may also include a processor. Each of these components may be in communication with one another (e.g., via one or more buses).

The receiver 1210 may receive information such as packets, user data, or control information associated with various information channels (e.g., control channels, data channels, and information related to numerology dependent signal transmission, etc.). Information may be passed on to other components of the device. The receiver 1210 may be an example of aspects of the transceiver 1440 described with reference to FIG. 14.

The UE signal transmission manager 1215 may be an example of aspects of the UE signal transmission manager 1415 described with reference to FIG. 14.

The UE signal transmission manager 1215 may also include tone spacing component 1225, signal repetition component 1230, subframe symbol component 1235, and signal receiving component 1240.

The tone spacing component 1225 may identify a tone spacing from a set of available tone spacings and identify a second tone spacing from the set of available tone spacings.

The signal repetition component 1230 may determine a first number of repetitions of a first signal based on the identified tone spacing, or based on signaling information of a control channel (RRC, PDCCH, PUCCH), determine a second number of repetitions of a second signal based on the determined second tone spacing, or based on signaling information of a control channel (RRC, PDCCH, PUCCH), where the determined second number of repetitions is different from the determined first number of repetitions, and determine the first number of repetitions of the first signal is based on a carrier frequency associated with a spectrum band. In some cases, the first signal includes one of a BRRS, a PSS, an SSS, an ESS, a PBCH, a BRS, a PDCCH, or a PUCCH.

The subframe symbol component 1235 may determine a number of symbols to be used in a subframe for reception of a signal based on the identified tone spacing, or based on signaling information of a control channel (RRC, PDCCH, PUCCH), determine a second number of symbols of a second signal based on the determined second tone spacing, or based on signaling information of a control channel (RRC, PDCCH, PUCCH), identifying a second spectrum band for reception of the second signal, where identifying the second tone spacing is based on the identified second spectrum band, and determine the number of symbols is based on a carrier frequency associated with the spectrum band.

The signal receiving component 1240 may receive the first signal based on the determined first number of repetitions and the identified tone spacing and receive the signal based on the determined number of symbols and the identified tone spacing. In some cases, receiving the first signal includes: combining multiple repetitions of the first signal based on the determined first number of repetitions. In some cases, determining the first number of repetitions of the first signal includes: receiving an indication of the first number of repetitions using at least one of a radio resource control channel or a physical downlink control channel. In some cases, receiving the signal includes: combining multiple symbols of the subframe based on the determined number of symbols. In some cases, determining the number of symbols includes: receiving an indication of the number of symbols using at least one of a radio resource control channel or a physical downlink control channel.

In some examples, the signal receiving component 1240 may perform any of the above receptions in conjunction with receiver 1210 and in some cases, the signal receiving component 1240 may perform a portion of the above receptions while the receiver 1210 performs other portion(s).

The transmitter 1220 may transmit signals generated by other components of the device. In some examples, the transmitter 1220 may be collocated with a receiver 1205 in a transceiver module. For example, the transmitter 1220 may be an example of aspects of the transceiver 1440 described with reference to FIG. 14. The transmitter 1220 may include a single antenna, or may include a set of antennas.

Figure 13:
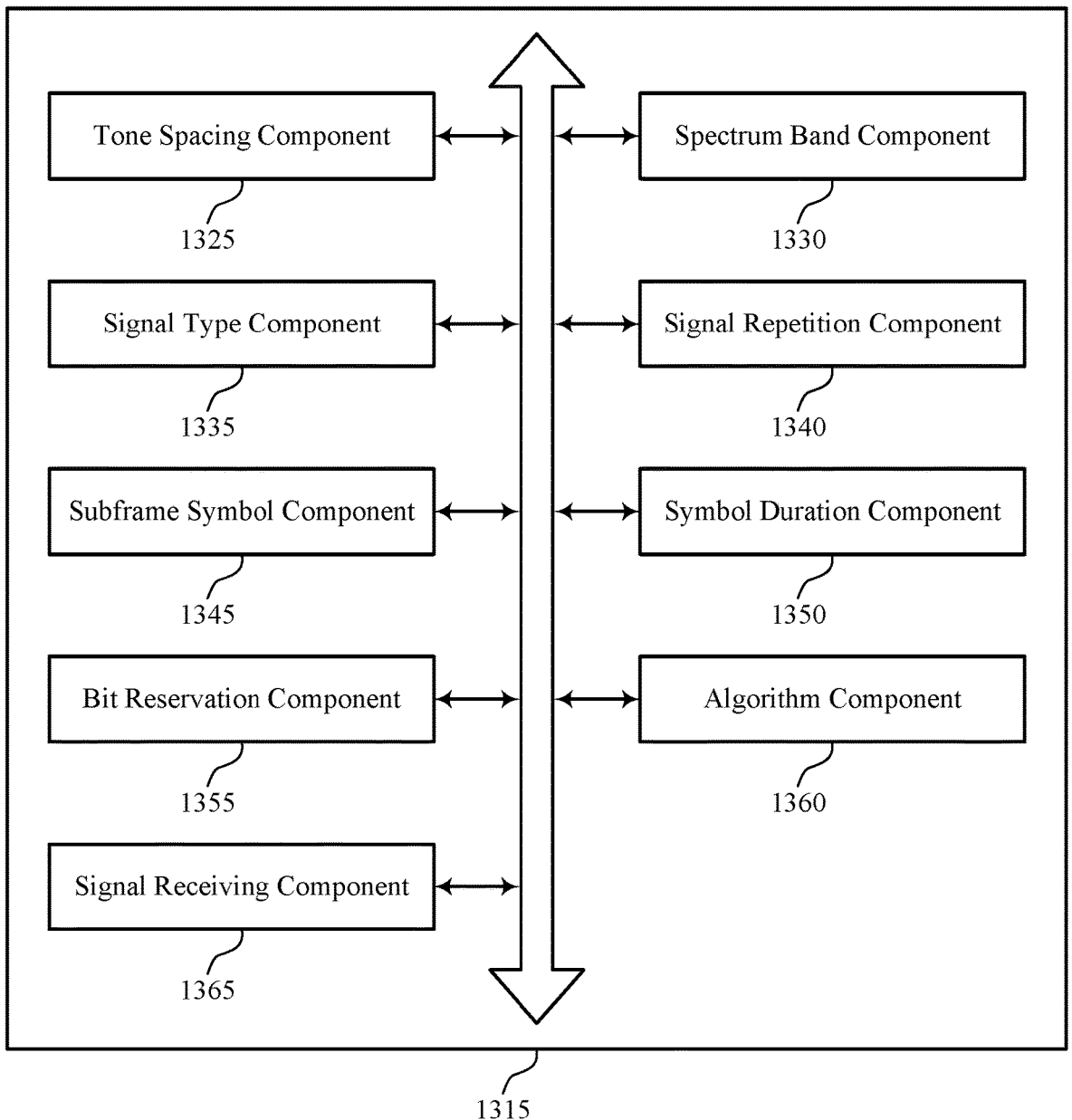

FIG. 13 shows a block diagram 1300 of a UE signal transmission manager 1315 that supports numerology dependent signal transmission in accordance with various aspects of the present disclosure. The UE signal transmission manager 1315 may be an example of aspects of a UE signal transmission manager 1115, a UE signal transmission manager 1215, or a UE signal transmission manager 1415 described with reference to FIGS. 11, 12, and 14. The UE signal transmission manager 1315 may include tone spacing component 1325, signal repetition component 1330, signal receiving component 1335, and subframe symbol component 1355. Each of these modules may communicate, directly or indirectly, with one another (e.g., via one or more buses).

The tone spacing component 1325 may identify a tone spacing from a set of available tone spacings and identify a second tone spacing from the set of available tone spacings.

The spectrum band component 1330 may identify a spectrum band for reception of the signal, where identifying the tone spacing is based on the identified spectrum band.

The signal type component 1335 may determine signal type. In some cases, the signal type includes one of a BRRS, a PSS, an SSS, a PBCH, a PDCCH, or a PUCCH.

The signal repetition component 1340 may determine a first number of repetitions of a first signal based on the identified tone spacing, or based on signaling information of a control channel (RRC, PDCCH, PUCCH). The signal repetition component 1340 may determine a second number of repetitions of a second signal based on the determined second tone spacing, or based on signaling information of a control channel (RRC, PDCCH, PUCCH), where the determined second number of repetitions is different from the determined first number of repetitions. The signal repetition component 1340 may determine the first number of repetitions of the first signal is based on a carrier frequency associated with a spectrum band. In some cases, the first signal includes one of a BRRS, a PSS, an SSS, a PBCH, a PDCCH, or a PUCCH.

The subframe symbol component 1345 may determine a number of symbols to be used in a subframe for reception of a signal based on the identified tone spacing, or based on signaling information of a control channel (RRC, PDCCH, PUCCH), determine a second number of symbols of a second signal based on the determined second tone spacing, or based on signaling information of a control channel (RRC, PDCCH, PUCCH), identifying a second spectrum band for reception of the second signal, where identifying the second tone spacing is based on the identified second spectrum band, and determine the number of symbols is based on a carrier frequency associated with the spectrum band.

The symbol duration component 1350 may determine a symbol duration for each of the number of symbols, where receiving the signal is based on the determined symbol duration.

The bit reservation component 1355 may obtain one or more reserved bits. In some cases, receiving the first number of repetitions using a PDCCH includes: obtaining reserved bits in downlink control information that convey the first number of repetitions. In some cases, receiving the number of symbols using a PDCCH includes: obtaining reserved bits in downlink control information that convey the number of symbols.

The algorithm component 1360 may determine a receiver algorithm to receive signal based on the determined tone spacing.

The signal receiving component 1365 may receive the first signal based on the determined first number of repetitions and the identified tone spacing and receive the signal based on the determined number of symbols and the identified tone spacing. In some cases, receiving the first signal includes: combining multiple repetitions of the first signal based on the determined first number of repetitions. In some cases, determining the first number of repetitions of the first signal includes: receiving an indication of the first number of repetitions using at least one of an RRC channel or a PDCCH. In some cases, receiving the signal includes: combining multiple symbols of the subframe based on the determined number of symbols. In some cases, determining the number of symbols includes: receiving an indication of the number of symbols using at least one of an RRC channel or a PDCCH.

In some examples, the signal receiving component 1365 may perform any of the above receptions in conjunction with a receiver such as receiver 1210 in FIG. 12.

Figure 14:
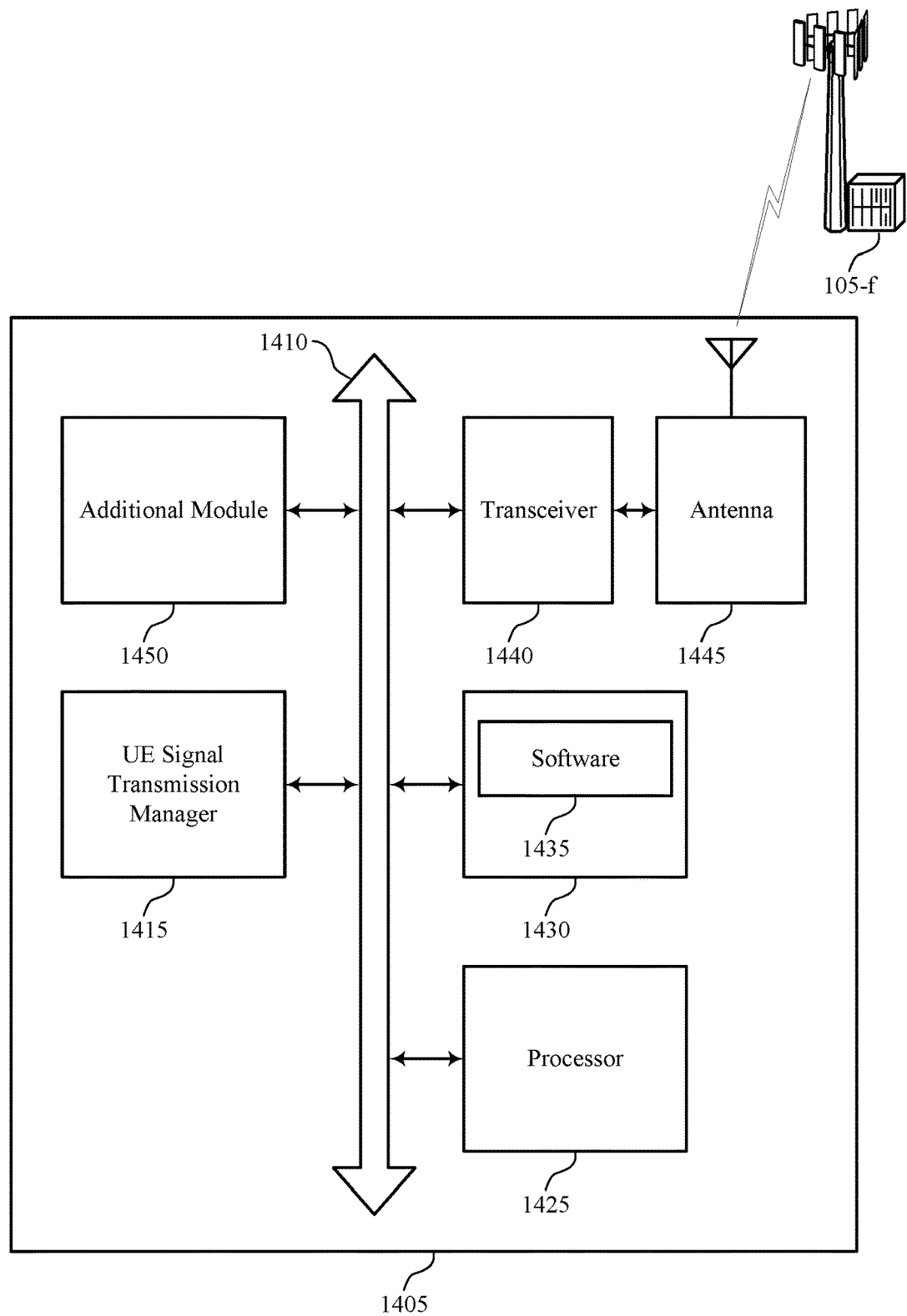
FIG. 14 illustrates a block diagram of a system including a user equipment (UE) that supports numerology dependent signal transmission in accordance with aspects of the present disclosure.

FIG. 14 shows a diagram of a system 1400 including a device 1405 that supports numerology dependent signal transmission in accordance with various aspects of the present disclosure. Device 1405 may be an example of a wireless device 1100, wireless device 1200, or a UE 115 as described above, e.g., with reference to FIGS. 1, 2, 5, 6, 11 and 12.

Device 1405 may include components for bi-directional voice and data communications including components for transmitting and receiving communications, including UE signal transmission manager 1415, processor 1425, memory 1430, software 1435, transceiver 1440, antenna 1445, and additional module 1450.

The processor 1425 may include an intelligent hardware device, (e.g., a CPU, a microcontroller, an ASIC, etc.)

The memory 1430 may include RAM and ROM. The memory 1430 may store computer-readable, computer-executable software 1435 including instructions that, when executed, cause the processor to perform various functions described herein. In some cases, the memory 1430 may contain, among other things, a BIOS which may control basic hardware and/or software operation such as the interaction with peripheral components or devices.

Software 1435 may include code to implement aspects of the present disclosure, including code to support numerology dependent signal transmission. Software 1435 may be stored in a non-transitory computer-readable medium such as system memory or other memory. In some cases, the software 1435 may not be directly executable by the processor but may cause a computer (e.g., when compiled and executed) to perform functions described herein.

The transceiver 1440 may communicate bi-directionally, via one or more antennas, wired, or wireless links as described above. For example, the transceiver 1440 may represent a wireless transceiver and may communicate bi-directionally with another wireless transceiver. The transceiver 1440 may also include a modem to modulate the packets and provide the modulated packets to the antennas for transmission, and to demodulate packets received from the antennas.

In some cases, the wireless device may include a single antenna 1445. However, in some cases the device may have more than one antenna 1445, which may be capable of concurrently transmitting or receiving multiple wireless transmissions.

Figure 15:
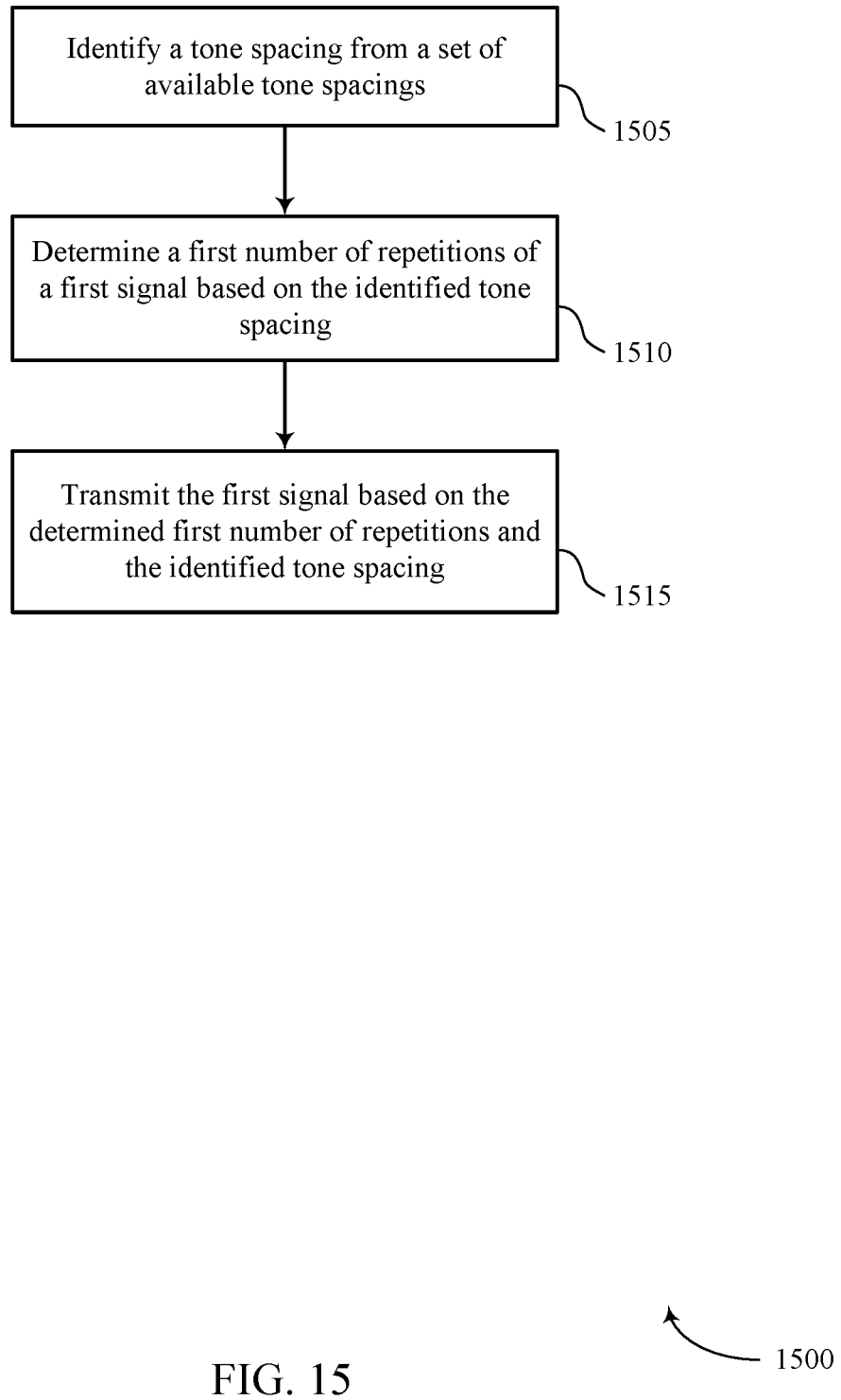
FIGS. 15 through 24 illustrate methods for numerology dependent signal transmission in accordance with aspects of the present disclosure.

FIG. 15 shows a flowchart illustrating a method 1500 for numerology dependent signal transmission in accordance with various aspects of the present disclosure. The operations of method 1500 may be implemented by a base station 105 or its components as described herein. For example, the operations of method 1500 may be performed by a base station signal transmission manager as described with reference to FIGS. 7 through 9. In some examples, a base station 105 may execute a set of codes to control the functional elements of the device to perform the functions described below. Additionally or alternatively, the base station 105 may perform aspects the functions described below using special-purpose hardware.

At block 1505, the base station 105 may identify a tone spacing from a set of available tone spacings. The operations of block 1505 may be performed according to the methods described with reference to FIGS. 2 through 6. In certain examples, the operations of block 1505 may be performed by a tone spacing component as described with reference to FIG. 9.

At block 1510, the base station 105 may determine a first number of repetitions of a first signal based on the identified tone spacing. The operations of block 1510 may be performed according to the methods described with reference to FIGS. 2 through 6. In certain examples, the operations of block 1510 may be performed by a signal repetition component as described with reference to FIG. 9.

At block 1515, the base station 105 may transmit the first signal based on the determined first number of repetitions and the identified tone spacing. The operations of block 1515 may be performed according to the methods described with reference to FIGS. 2 through 6. In certain examples, the operations of block 1515 may be performed by a signal transmitting component as described with reference to FIGS. 8 and 9.

Figure 16:
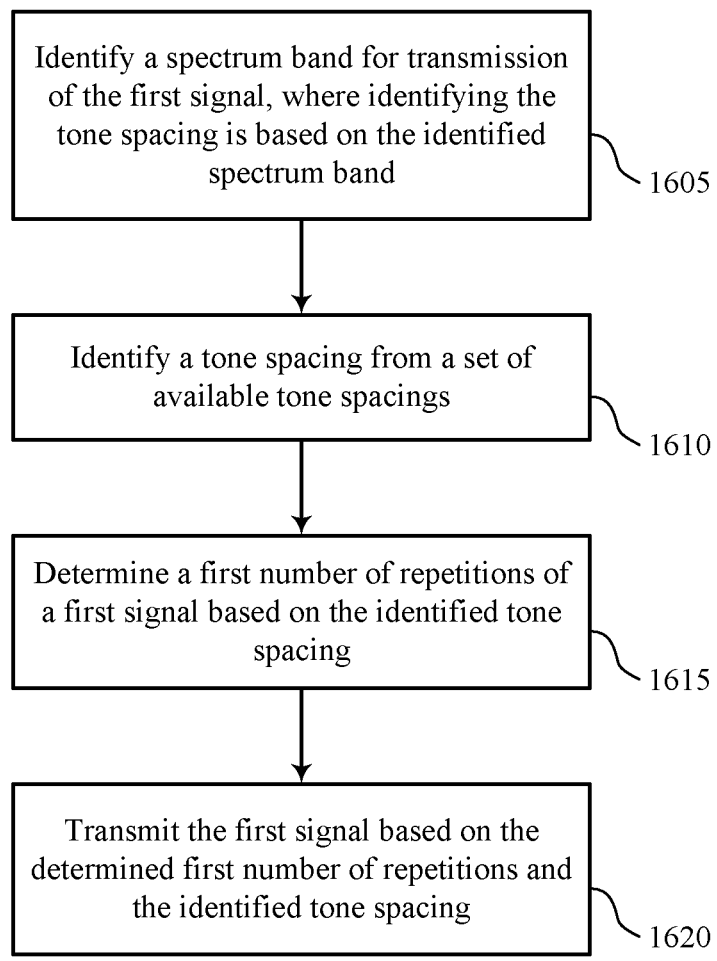

FIG. 16 shows a flowchart illustrating a method 1600 for numerology dependent signal transmission in accordance with various aspects of the present disclosure. The operations of method 1600 may be implemented by a base station 105 or its components as described herein. For example, the operations of method 1600 may be performed by a base station signal transmission manager as described with reference to FIGS. 7 through 9. In some examples, a base station 105 may execute a set of codes to control the functional elements of the device to perform the functions described below. Additionally or alternatively, the base station 105 may perform aspects the functions described below using special-purpose hardware.

At block 1605, the base station 105 may identify a spectrum band for transmission of the first signal, where identifying the tone spacing is based on the identified spectrum band. The operations of block 1605 may be performed according to the methods described with reference to FIGS. 2 through 6. In certain examples, the operations of block 1605 may be performed by a spectrum band component as described with reference to FIG. 9.

At block 1610, the base station 105 may identify a tone spacing from a set of available tone spacings. The operations of block 1610 may be performed according to the methods described with reference to FIGS. 2 through 6. In certain examples, the operations of block 1610 may be performed by a tone spacing component as described with reference to FIG. 9.

At block 1615, the base station 105 may determine a first number of repetitions of a first signal based on the identified tone spacing. The operations of block 1615 may be performed according to the methods described with reference to FIGS. 2 through 6. In certain examples, the operations of block 1615 may be performed by a signal repetition component as described with reference to FIG. 9.

At block 1620, the base station 105 may transmit the first signal based on the determined first number of repetitions and the identified tone spacing. The operations of block 1620 may be performed according to the methods described with reference to FIGS. 2 through 6. In certain examples, the operations of block 1620 may be performed by a signal transmitting component as described with reference to FIGS. 8 and 9.

Figure 17:
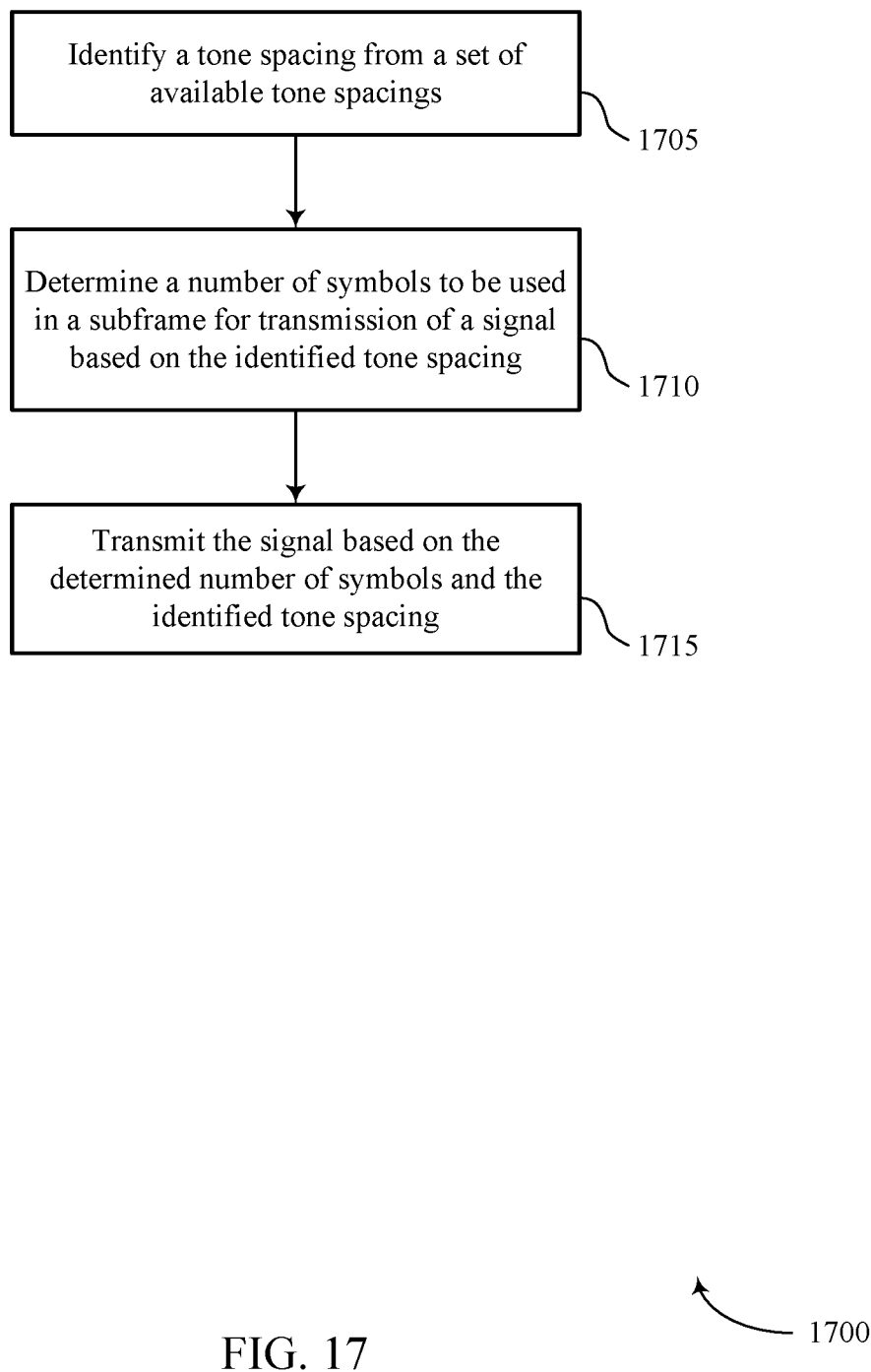

FIG. 17 shows a flowchart illustrating a method 1700 for numerology dependent signal transmission in accordance with various aspects of the present disclosure. The operations of method 1700 may be implemented by a base station 105 or its components as described herein. For example, the operations of method 1700 may be performed by a base station signal transmission manager as described with reference to FIGS. 7 through 9. In some examples, a base station 105 may execute a set of codes to control the functional elements of the device to perform the functions described below. Additionally or alternatively, the base station 105 may perform aspects the functions described below using special-purpose hardware.

At block 1705, the base station 105 may identify a tone spacing from a set of available tone spacings. The operations of block 1705 may be performed according to the methods described with reference to FIGS. 2 through 6. In certain examples, the operations of block 1705 may be performed by a tone spacing component as described with reference to FIG. 9.

At block 1710, the base station 105 may determine a number of symbols to be used in a subframe for transmission of a signal based on the identified tone spacing. The operations of block 1710 may be performed according to the methods described with reference to FIGS. 2 through 6. In certain examples, the operations of block 1710 may be performed by a subframe symbol component as described with reference to FIG. 9.

At block 1715, the base station 105 may transmit the signal based on the determined number of symbols and the identified tone spacing. The operations of block 1715 may be performed according to the methods described with reference to FIGS. 2 through 6. In certain examples, the operations of block 1715 may be performed by a signal transmitting component as described with reference to FIGS. 8 and 9.

Figure 18:
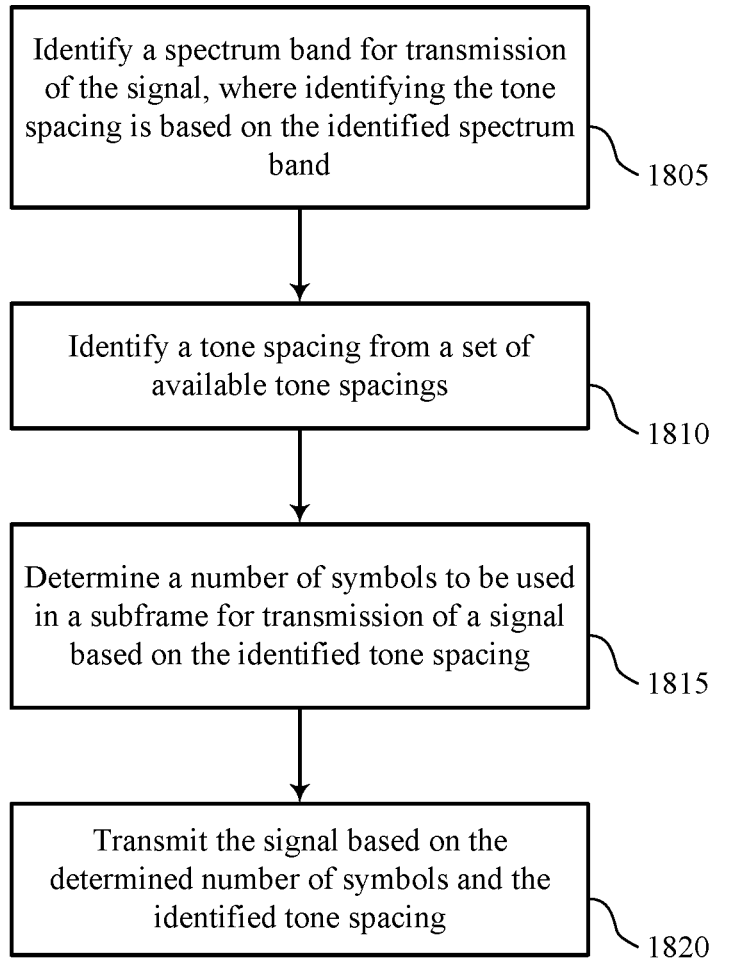

FIG. 18 shows a flowchart illustrating a method 1800 for numerology dependent signal transmission in accordance with various aspects of the present disclosure. The operations of method 1800 may be implemented by a base station 105 or its components as described herein. For example, the operations of method 1800 may be performed by a base station signal transmission manager as described with reference to FIGS. 7 through 9. In some examples, a base station 105 may execute a set of codes to control the functional elements of the device to perform the functions described below. Additionally or alternatively, the base station 105 may perform aspects the functions described below using special-purpose hardware.

At block 1805, the base station 105 may identify a spectrum band for transmission of the signal, where identifying the tone spacing is based on the identified spectrum band. The operations of block 1805 may be performed according to the methods described with reference to FIGS. 2 through 6. In certain examples, the operations of block 1805 may be performed by a spectrum band component as described with reference to FIG. 9.

At block 1810, the base station 105 may identify a tone spacing from a set of available tone spacings. The operations of block 1810 may be performed according to the methods described with reference to FIGS. 2 through 6. In certain examples, the operations of block 1810 may be performed by a tone spacing component as described with reference to FIG. 9.

At block 1815, the base station 105 may determine a number of symbols to be used in a subframe for transmission of a signal based on the identified tone spacing. The operations of block 1815 may be performed according to the methods described with reference to FIGS. 2 through 6. In certain examples, the operations of block 1815 may be performed by a subframe symbol component as described with reference to FIG. 9.

At block 1820, the base station 105 may transmit the signal based on the determined number of symbols and the identified tone spacing. The operations of block 1820 may be performed according to the methods described with reference to FIGS. 2 through 6. In certain examples, the operations of block 1820 may be performed by a signal transmitting component as described with reference to FIGS. 8 and 9.

Figure 19:
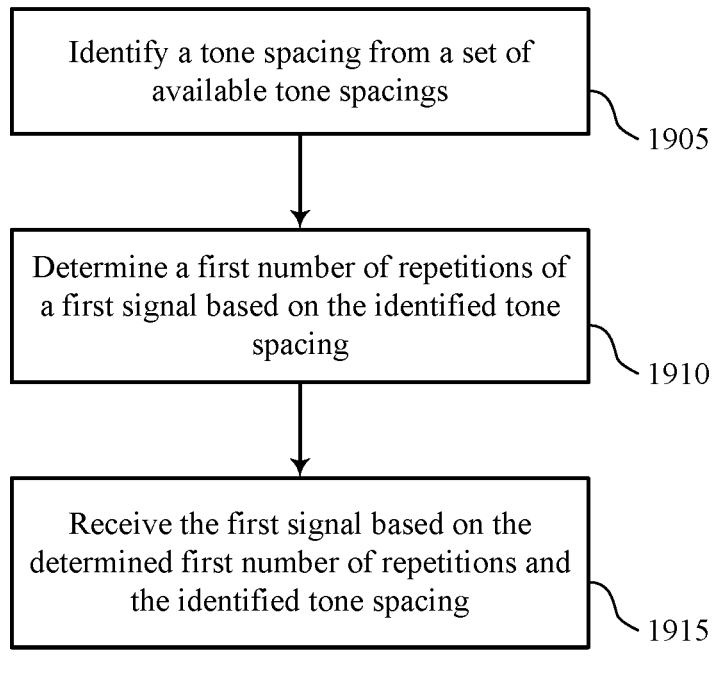

FIG. 19 shows a flowchart illustrating a method 1900 for numerology dependent signal transmission in accordance with various aspects of the present disclosure. The operations of method 1900 may be implemented by a UE 115 or its components as described herein. For example, the operations of method 1900 may be performed by a UE signal transmission manager as described with reference to FIGS. 11 through 13. In some examples, a UE 115 may execute a set of codes to control the functional elements of the device to perform the functions described below. Additionally or alternatively, the UE 115 may perform aspects the functions described below using special-purpose hardware.

At block 1905, the UE 115 may identify a tone spacing from a set of available tone spacings. The operations of block 1905 may be performed according to the methods described with reference to FIGS. 2 through 6. In certain examples, the operations of block 1905 may be performed by a tone spacing component as described with reference to FIGS. 12 and 13.

At block 1910, the UE 115 may determine a first number of repetitions of a first signal based on the identified tone spacing. The operations of block 1910 may be performed according to the methods described with reference to FIGS. 2 through 6. In certain examples, the operations of block 1910 may be performed by a signal repetition component as described with reference to FIGS. 12 and 13.

At block 1915, the UE 115 may receive the first signal based on the determined first number of repetitions and/or the identified tone spacing. In some examples, the UE 115 may combine the received signal according to the first number of repetitions. The UE 115 may combine the signal coherently or non-coherently according to signal type. The operations of block 1915 may be performed according to the methods described with reference to FIGS. 2 through 6. In certain examples, the operations of block 1915 may be performed by a signal receiving component as described with reference to FIGS. 12 and 13.

Figure 20:
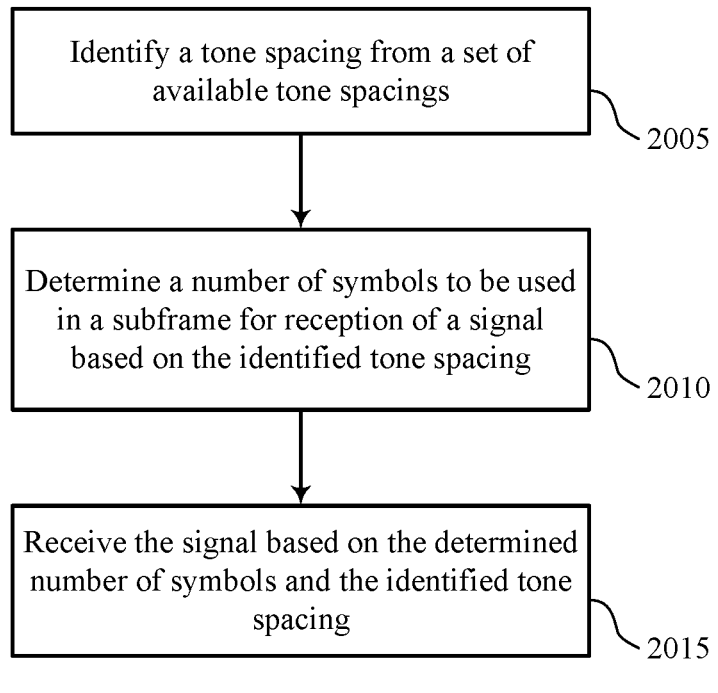

FIG. 20 shows a flowchart illustrating a method 2000 for numerology dependent signal transmission in accordance with various aspects of the present disclosure. The operations of method 2000 may be implemented by a UE 115 or its components as described herein. For example, the operations of method 2000 may be performed by a UE signal transmission manager as described with reference to FIGS. 11 through 13. In some examples, a UE 115 may execute a set of codes to control the functional elements of the device to perform the functions described below. Additionally or alternatively, the UE 115 may perform aspects the functions described below using special-purpose hardware.

At block 2005, the UE 115 may identify a tone spacing from a set of available tone spacings. The operations of block 2005 may be performed according to the methods described with reference to FIGS. 2 through 6. In certain examples, the operations of block 2005 may be performed by a tone spacing component as described with reference to FIGS. 12 and 13.

At block 2010, the UE 115 may determine a number of symbols to be used in a subframe for reception of a signal based on the identified tone spacing. The UE 115 may combine the received signal according to the determined number of symbols. In some examples, the UE 115 may combine the signal coherently or non-coherently according to signal type. The operations of block 2010 may be performed according to the methods described with reference to FIGS. 2 through 6. In certain examples, the operations of block 2010 may be performed by a subframe symbol component as described with reference to FIGS. 12 and 13.

At block 2015, the UE 115 may receive the signal based on the determined number of symbols and the identified tone spacing. The operations of block 2015 may be performed according to the methods described with reference to FIGS. 2 through 6. In certain examples, the operations of block 2015 may be performed by a signal receiving component as described with reference to FIGS. 12 and 13.

Figure 21:
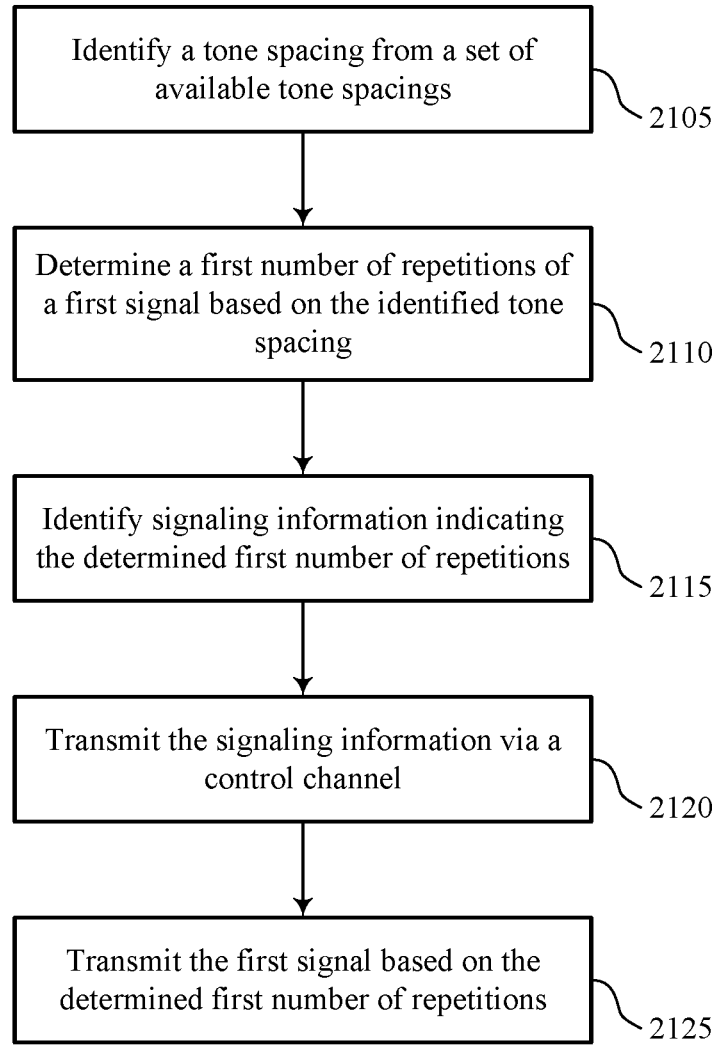

FIG. 21 shows a flowchart illustrating a method 2100 for numerology dependent signal transmission in accordance with various aspects of the present disclosure. The operations of method 2100 may be implemented by a base station 105 or its components as described herein. For example, the operations of method 2100 may be performed by a base station signal transmission manager as described with reference to FIGS. 7 through 9. In some examples, a base station 105 may execute a set of codes to control the functional elements of the device to perform the functions described below. Additionally or alternatively, the base station 105 may perform aspects the functions described below using special-purpose hardware.

At block 2105 the base station 105 may identify a tone spacing from a plurality of available tone spacings. The operations of block 2105 may be performed according to the methods described with reference to FIGS. 2 through 6. In certain examples, aspects of the operations of block 2105 may be performed by a tone spacing component as described with reference to FIGS. 7 through 9.

At block 2110 the base station 105 may determine a first number of repetitions of a first signal based at least in part on the identified tone spacing. The operations of block 2110 may be performed according to the methods described with reference to FIGS. 2 through 6. In certain examples, aspects of the operations of block 2110 may be performed by a signal repetition component as described with reference to FIGS. 7 through 9.

At block 2115 the base station 105 may identify signaling information indicating the determined first number of repetitions. The operations of block 2115 may be performed according to the methods described with reference to FIGS. 2 through 6. In certain examples, aspects of the operations of block 2115 may be performed by a signal repetition component as described with reference to FIGS. 7 through 9.

At block 2120 the base station 105 may transmit the signaling information via a control channel. The operations of block 2120 may be performed according to the methods described with reference to FIGS. 2 through 6. In certain examples, aspects of the operations of block 2120 may be performed by a signal transmitting component as described with reference to FIGS. 7 through 9.

At block 2125 the base station 105 may transmit the first signal based at least in part on the determined first number of repetitions. The operations of block 2125 may be performed according to the methods described with reference to FIGS. 2 through 6. In certain examples, aspects of the operations of block 2125 may be performed by a signal transmitting component as described with reference to FIGS. 7 through 9.

Figure 22:
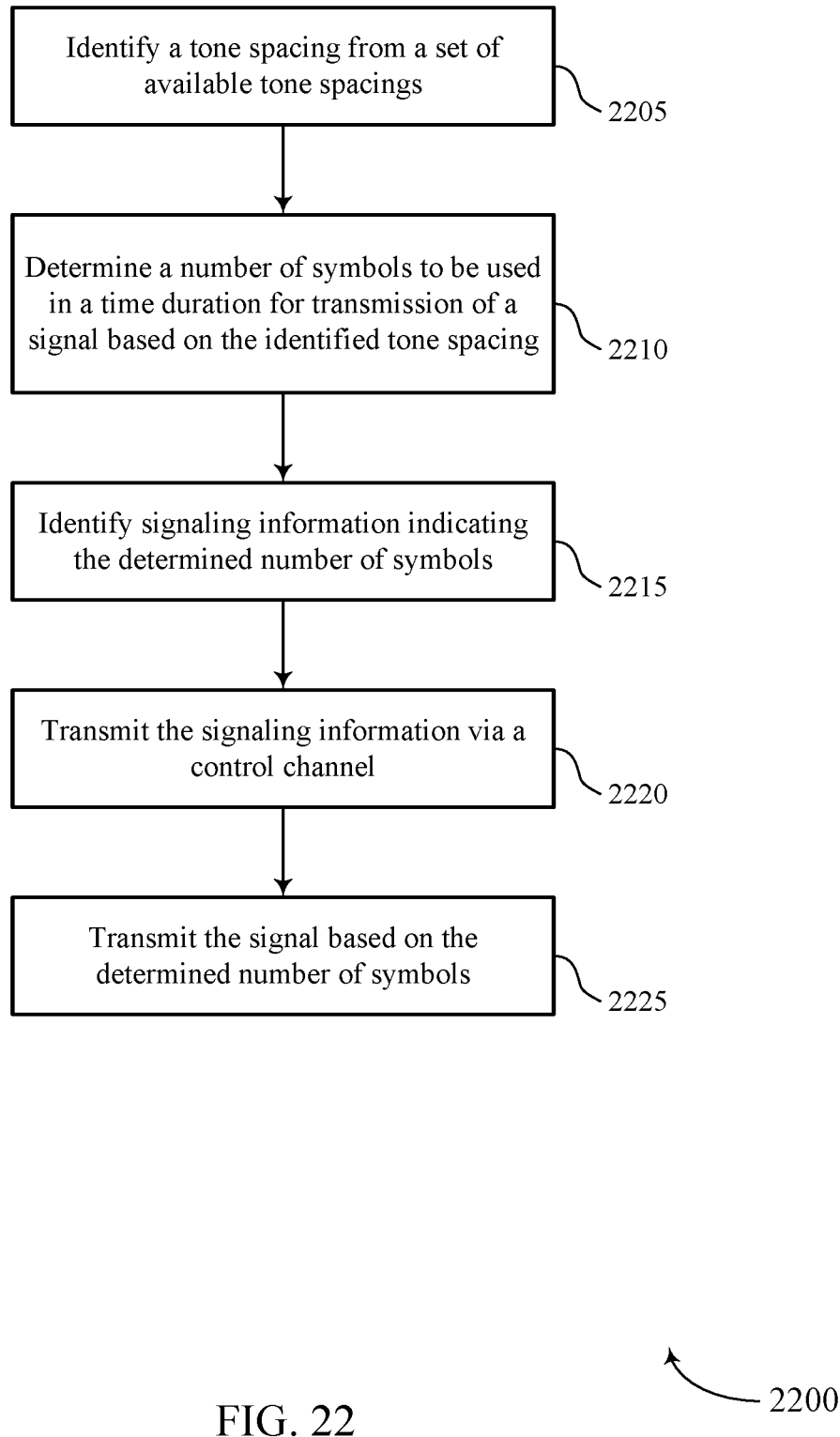

FIG. 22 shows a flowchart illustrating a method 2200 for numerology dependent signal transmission in accordance with various aspects of the present disclosure. The operations of method 2200 may be implemented by a base station 105 or its components as described herein. For example, the operations of method 2200 may be performed by a base station signal transmission manager as described with reference to FIGS. 7 through 9. In some examples, a base station 105 may execute a set of codes to control the functional elements of the device to perform the functions described below. Additionally or alternatively, the base station 105 may perform aspects the functions described below using special-purpose hardware.

At block 2205 the base station 105 may identify a tone spacing from a plurality of available tone spacings. The operations of block 2205 may be performed according to the methods described with reference to FIGS. 2 through 6. In certain examples, aspects of the operations of block 2205 may be performed by a tone spacing component as described with reference to FIGS. 7 through 9.

At block 2210 the base station 105 may determine a number of symbols to be used in a time duration for transmission of a signal based at least in part on the identified tone spacing. The operations of block 2210 may be performed according to the methods described with reference to FIGS. 2 through 6. In certain examples, aspects of the operations of block 2210 may be performed by a subframe symbol component as described with reference to FIGS. 7 through 9.

At block 2215 the base station 105 may identify signaling information indicating the determined number of symbols. The operations of block 2215 may be performed according to the methods described with reference to FIGS. 2 through 6. In certain examples, aspects of the operations of block 2215 may be performed by a subframe symbol component as described with reference to FIGS. 7 through 9.

At block 2220 the base station 105 may transmit the signaling information via a control channel. The operations of block 2220 may be performed according to the methods described with reference to FIGS. 2 through 6. In certain examples, aspects of the operations of block 2220 may be performed by a signal transmitting component as described with reference to FIGS. 7 through 9.

At block 2225 the base station 105 may transmit the signal based at least in part on the determined number of symbols. The operations of block 2225 may be performed according to the methods described with reference to FIGS. 2 through 6. In certain examples, aspects of the operations of block 2225 may be performed by a signal transmitting component as described with reference to FIGS. 7 through 9.

Figure 23:
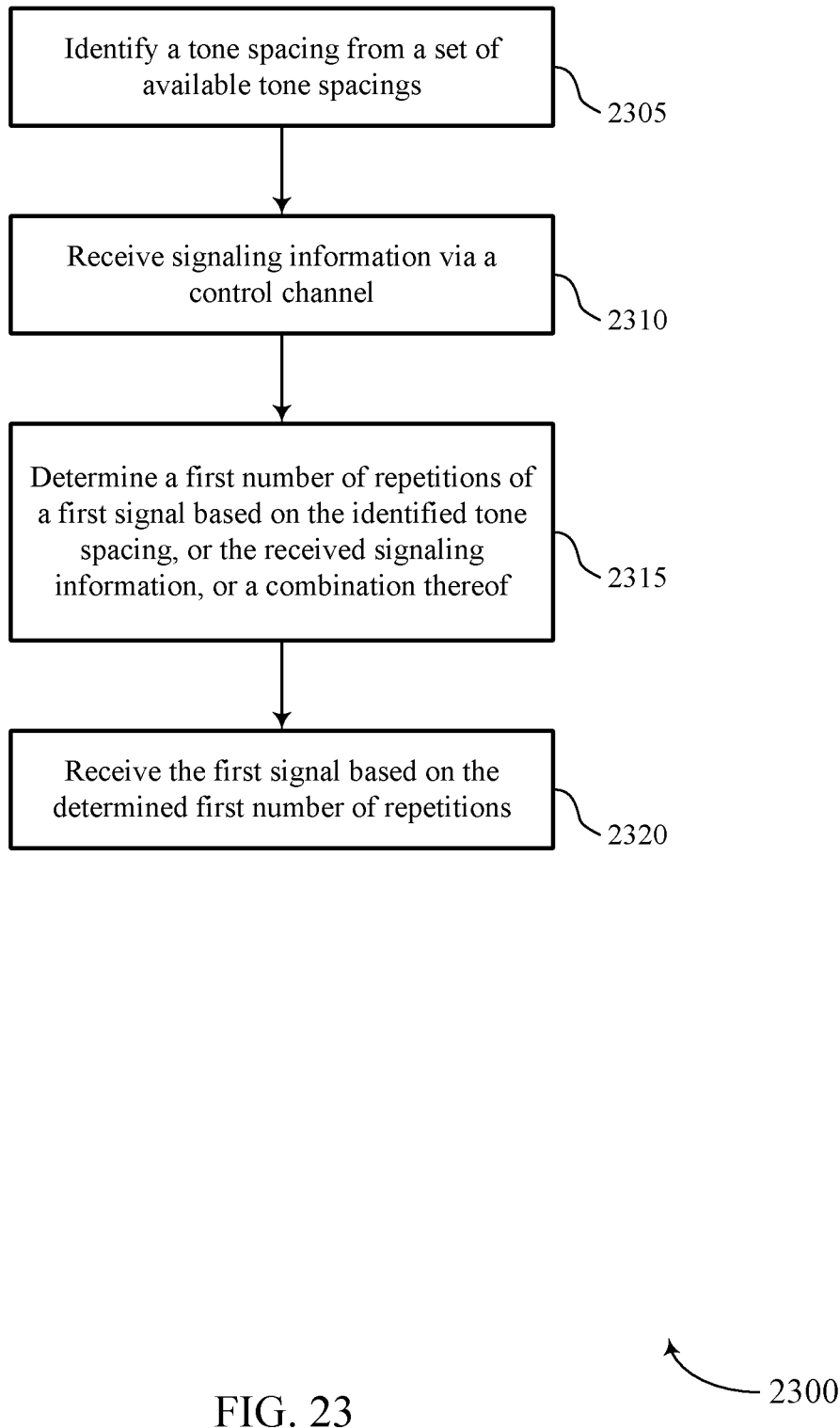

FIG. 23 shows a flowchart illustrating a method 2300 for numerology dependent signal transmission in accordance with various aspects of the present disclosure. The operations of method 2300 may be implemented by a UE 115 or its components as described herein. For example, the operations of method 2300 may be performed by a UE signal transmission manager as described with reference to FIGS. 11 through 13. In some examples, a UE 115 may execute a set of codes to control the functional elements of the device to perform the functions described below. Additionally or alternatively, the UE 115 may perform aspects the functions described below using special-purpose hardware.

At block 2305 the UE 115 may identify a tone spacing from a plurality of available tone spacings. The operations of block 2305 may be performed according to the methods described with reference to FIGS. 2 through 6. In certain examples, aspects of the operations of block 2305 may be performed by a tone spacing component as described with reference to FIGS. 11 through 13.

At block 2310 the UE 115 may receive signaling information via a control channel. The operations of block 2310 may be performed according to the methods described with reference to FIGS. 2 through 6. In certain examples, aspects of the operations of block 2310 may be performed by a signal receiving component as described with reference to FIGS. 11 through 13.

At block 2315 the UE 115 may determine a first number of repetitions of a first signal based at least in part on the identified tone spacing, or the received signaling information, or a combination thereof. The operations of block 2315 may be performed according to the methods described with reference to FIGS. 2 through 6. In certain examples, aspects of the operations of block 2315 may be performed by a signal repetition component as described with reference to FIGS. 11 through 13.

At block 2320 the UE 115 may receive the first signal based at least in part on the determined first number of repetitions. The operations of block 2320 may be performed according to the methods described with reference to FIGS. 2 through 6. In certain examples, aspects of the operations of block 2320 may be performed by a signal receiving component as described with reference to FIGS. 11 through 13.

Figure 24:
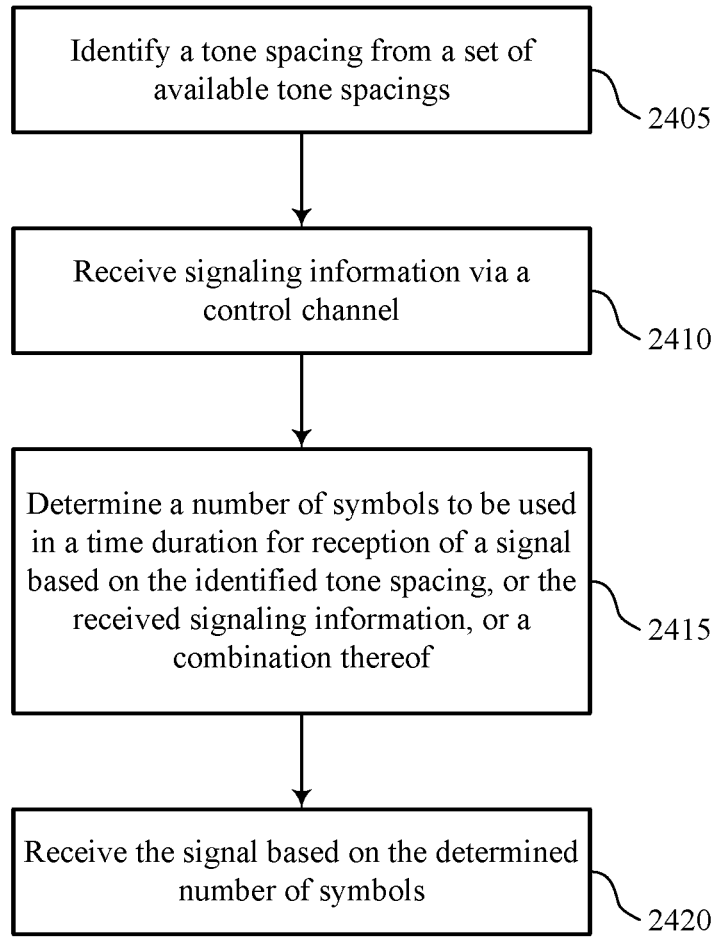

FIG. 24 shows a flowchart illustrating a method 2400 for numerology dependent signal transmission in accordance with various aspects of the present disclosure. The operations of method 2400 may be implemented by a UE 115 or its components as described herein. For example, the operations of method 2400 may be performed by a UE signal transmission manager as described with reference to FIGS. 11 through 13. In some examples, a UE 115 may execute a set of codes to control the functional elements of the device to perform the functions described below. Additionally or alternatively, the UE 115 may perform aspects the functions described below using special-purpose hardware.

At block 2405 the UE 115 may identify a tone spacing from a plurality of available tone spacings. The operations of block 2405 may be performed according to the methods described with reference to FIGS. 2 through 6. In certain examples, aspects of the operations of block 2405 may be performed by a tone spacing component as described with reference to FIGS. 11 through 13.

At block 2410 the UE 115 may receive signaling information via a control channel. The operations of block 2410 may be performed according to the methods described with reference to FIGS. 2 through 6. In certain examples, aspects of the operations of block 2410 may be performed by a signal receiving component as described with reference to FIGS. 11 through 13.

At block 2415 the UE 115 may determine a number of symbols to be used in a time duration for reception of a signal based at least in part on the identified tone spacing, or the received signaling information, or a combination thereof. The operations of block 2415 may be performed according to the methods described with reference to FIGS. 2 through 6. In certain examples, aspects of the operations of block 2415 may be performed by a subframe symbol component as described with reference to FIGS. 11 through 13.

At block 2420 the UE 115 may receive the signal based at least in part on the determined number of symbols. The operations of block 2420 may be performed according to the methods described with reference to FIGS. 2 through 6. In certain examples, aspects of the operations of block 2420 may be performed by a signal receiving component as described with reference to FIGS. 11 through 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" is a 3GPP term that may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a network entity, comprising:
   determining a signal type and a tone spacing associated with a first reference signal, wherein the signal type corresponds to a data channel, and wherein the tone spacing is determined based at least in part on the signal type;
   determining, based at least in part on the signal type and the tone spacing, a first amount of symbols to be used for transmission of the first reference signal;
   determining a second amount of symbols of a second reference signal;
   identifying a first signaling information indicating the first amount of symbols;
   identifying second signaling information indicating the second amount of symbols;
   transmitting the first signaling information via one or more bits in downlink control information of a control channel;
   transmitting the second signaling information via the control channel;
   transmitting the first reference signal via the first amount of symbols in accordance with the signal type, the tone spacing, and the first signaling information; and
   transmitting the second reference signal based at least in part on the second amount of symbols.

2. The method of claim 1, wherein:
   the first amount of symbols are used in a time duration which denotes a subframe, a slot, a mini-slot, or any combination thereof.

3. The method of claim 1, wherein determining the first amount of symbols comprises:
   selecting the first amount of symbols from a set of predetermined symbols corresponding to a communication scenario.

4. The method of claim 3, wherein:
   the communication scenario comprises at least one of a handover procedure, a connection procedure, a scheduling procedure, or any combination thereof.

5. The method of claim 1, further comprising:
   determining a symbol duration for each of the first amount of symbols, wherein transmitting the first reference signal is based at least in part on the symbol duration.

6. The method of claim 1, wherein:
   the first reference signal comprises one of a beam refinement reference signal, a beam reference signal, or a channel state information reference signal.

7. The method of claim 1, wherein:
   the control channel comprises a radio resource control channel, a physical downlink control channel, a synchronization channel, or a broadcast channel.

8. A method for wireless communication at a user equipment (UE), comprising:
   determining a signal type and a tone spacing associated with a first reference signal, wherein the signal type corresponds to a data channel, and wherein the tone spacing is determined based at least in part on the signal type;
   receiving, via one or more bits in downlink control information of a control channel, a first signaling information indicating a first amount of symbols to be used for reception of the first reference signal;
   receiving, via the control channel, second signaling information indicating a second amount of symbols to be used for reception of a second reference signal;
   determining the first amount of symbols to be used for reception of the first reference signal based at least in part on the signal type, the tone spacing, and the first signaling information;
   determining the second amount of symbols to be used for reception of the second reference signal based at least in part on the second signaling information;
   receiving the first reference signal via the first amount of symbols in accordance with the signal type, the tone spacing, and the first signaling information; and
   receiving the second reference signal via the second amount of symbols in accordance with the second signaling information.

9. The method of claim 8, wherein receiving the first reference signal comprises:
   combining multiple symbols based at least in part on the first amount of symbols.

10. The method of claim 8, further comprising:
    determining a symbol duration for each of the first amount of symbols, wherein receiving the first reference signal is based at least in part on the determined symbol duration.

11. The method of claim 8, wherein:
    the first reference signal comprises one of a beam refinement reference signal, a beam reference signal, or a channel state information reference signal.

12. The method of claim 8, wherein:
    the control channel comprises a radio resource control channel, a physical downlink control channel, a synchronization channel, or a broadcast channel.

13. An apparatus for wireless communication at a user equipment (UE), comprising:
    a processor;
    memory coupled with the processor; and
    instructions stored in the memory and executable by the processor to cause the apparatus to:
    determine a signal type and a tone spacing associated with a first reference signal, wherein the signal type corresponds to a data channel, and wherein the tone spacing is determined based at least in part on the signal type;

receive, via one or more bits in downlink control information of a control channel, a first signaling information indicating a first amount of symbols to be used for transmission of the first reference signal;

receive, via the control channel, second signaling information indicating a second amount of symbols to be used for reception of a second reference signal;

determine the first amount of symbols to be used for transmission of the first reference signal based at least in part on the signal type, the tone spacing, and the first signaling information;

determine the second amount of symbols to be used for reception of the second reference signal based at least in part on the second signaling information;

transmit the first reference signal based at least in part on the first amount of symbols in accordance with the signal type, the tone spacing, and the first signaling information; and receive the second reference signal via the second amount of symbols in accordance with the second signaling information.

\* \* \* \* \*